US005745257A

United States Patent [19]
Kato et al.

[11] Patent Number: 5,745,257
[45] Date of Patent: Apr. 28, 1998

[54] COMMUNICATION DEVICE

[75] Inventors: Tokunori Kato, Ichinomiya; Junji Hatamura, Nagoya, both of Japan

[73] Assignee: Brother Kogyo Kabushiki Kaisha, Nagoya, Japan

[21] Appl. No.: 574,688

[22] Filed: Dec. 19, 1995

[30] Foreign Application Priority Data

| Dec. 28, 1994 | [JP] | Japan | 6-327871 |
| May 16, 1995 | [JP] | Japan | 7-116976 |
| May 19, 1995 | [JP] | Japan | 7-121179 |

[51] Int. Cl.[6] .................................................. H04N 1/00
[52] U.S. Cl. ...................... 358/440; 358/402; 358/444; 379/100; 379/200
[58] Field of Search .......................... 358/440, 400, 358/402, 403, 404, 405, 442, 468, 407, 444, 434, 435, 436, 438; 379/100, 200, 309, 272; H04N 1/00

[56] References Cited

U.S. PATENT DOCUMENTS

| 4,785,355 | 11/1988 | Matsumoto | 358/257 |
| 4,847,891 | 7/1989 | Kotani | 358/440 |
| 4,920,560 | 4/1990 | Kageyama | 358/440 |
| 4,924,496 | 5/1990 | Figa et al. | 379/142 |
| 4,942,599 | 7/1990 | Gordon et al. | 358/440 |
| 4,956,860 | 9/1990 | Murata | 358/440 |
| 5,014,300 | 5/1991 | Harvath et al. | 379/100 |
| 5,057,941 | 10/1991 | Moriya | 358/440 |
| 5,065,254 | 11/1991 | Hishida | 358/440 |
| 5,175,760 | 12/1992 | Ohashi et al. | 379/67 |
| 5,210,621 | 5/1993 | Kinoshita | 358/440 |
| 5,216,517 | 6/1993 | Kinoshita et al. | 358/440 |
| 5,237,428 | 8/1993 | Tajitsu et al. | 358/440 |
| 5,239,385 | 8/1993 | Ejiri | 358/440 |
| 5,270,833 | 12/1993 | Kubokawa et al. | 358/404 |
| 5,274,467 | 12/1993 | Takehiro et al. | 358/402 |
| 5,349,447 | 9/1994 | Kuwahara | 358/404 |
| 5,373,554 | 12/1994 | Sato | 379/387 |
| 5,414,494 | 5/1995 | Aikens et al. | 355/202 |
| 5,452,099 | 9/1995 | von Meister | 358/440 |
| 5,523,854 | 6/1996 | Hornsby | 358/440 |
| 5,594,867 | 1/1997 | Yoshida | 395/200 |

*Primary Examiner*—Edward L. Coles, Sr.
*Assistant Examiner*—Madeleine AV Nguyen
*Attorney, Agent, or Firm*—Oliff & Berridge, PLC

[57] ABSTRACT

A communication device that can operate as a facsimile only, telephone only, or combined device having the ability to retransmit data, either a message or identification data, originated at a first site to another site. The device has the capability of breaking communications when incoming data is identical to data previously received based upon the identification data of the originator.

15 Claims, 29 Drawing Sheets

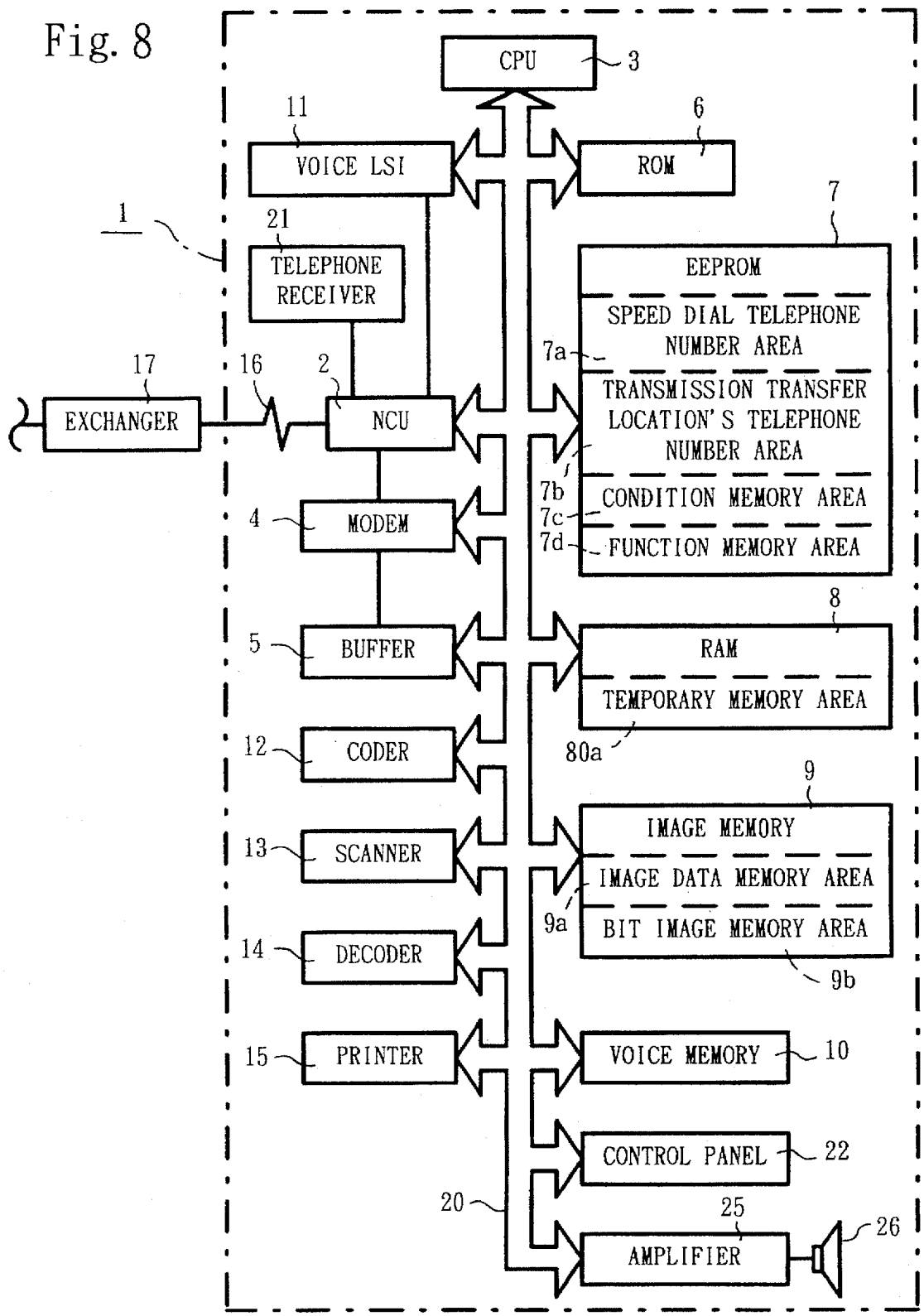

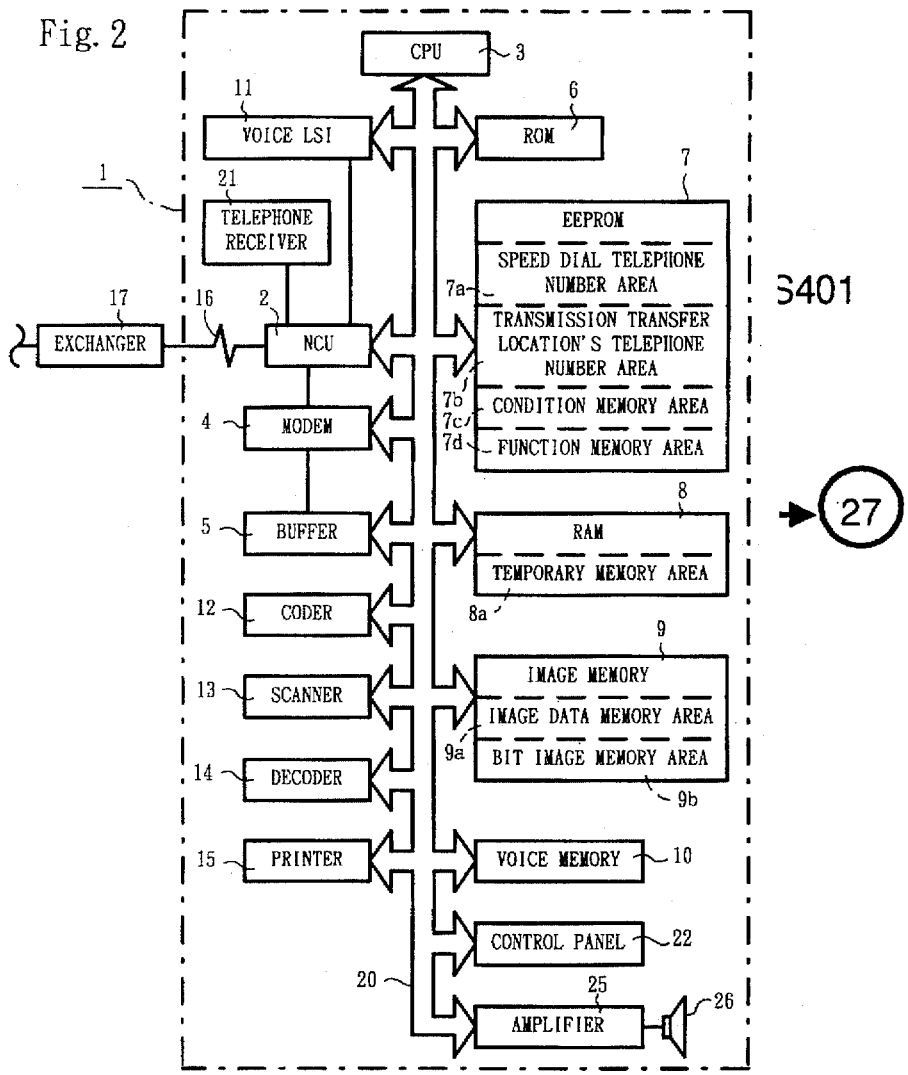

COMMUNICATION DEVICE

BACKGROUND OF THE INVENTION

1. Field of the Invention

The invention relates to a communication device which stores specified transmission transfer locations in a first memory means and calls the transmission transfer locations stored in the first memory means based on a data communication from another communication device.

2. Description of Related Art

A facsimile device composed of a built-in TAD (telephone answering device) mode is conventionally known. The built-in TAD mode is a mode which effectively functions when the recipient is not available. When the TAD mode is configured, or setup, it is accomplished in advance. A state, such as facsimile-only or telephone-only state, can be selected at the time of setup. If the telephone-only state is selected, the device is set as an answering machine. On the other hand, if the facsimile-only state is selected, either a facsimile forward function or a paging function can additionally be selected. After setup is accomplished as described above, the subsequent processes will be accomplished based on the contents of the setup if the built-in TAD mode is selected by means of a mode setup key.

In other words, if the device is in the telephone-only state, the responding message (referred to hereafter as an OGM: Outgoing Message) such as "please leave a message after the sound of tone" or the like, is played to the party who called the device and, then, the incoming message (referred to as ICM hereafter) from the calling party is stored to a memory medium.

On the other hand, if the device is in the facsimile-only state and the facsimile forward function is set, when another facsimile sends data to the device, the data are stored in a memory and the received data are printed out to recording paper, by means of a printer in the facsimile device, after being automatically sent to a pre-registered location for transfer to which the data has been designated. Normally, the facsimile device erases the received data stored in the memory upon the completion of printing of the data on the recording paper. However, with the facsimile forward function, the received data will be erased from the memory after transmitting the contents to the transmission transfer location. In addition, the instruction as to whether the received data should be printed on the recording paper is changeable depending upon the device configuration.

Moreover, if a paging function is configured in the facsimile-only state, when another facsimile sends data, the receiving device automatically dials the registered telephone number, to be paged, and then hangs up after a certain elapsed time, after printing out the contents by the printer in the receiving facsimile device if the person or a department is not available which is supposed to receive the facsimile. In other words, it accomplishes a similar function to a pager.

However, with a conventional facsimile device, when the facsimile forward function or the paging function is configured, there has been a problem in that when the facsimile receives the data sent from another facsimile device, if other receiving locations for facsimile(s) and/or telephone(s) are pre-registered in a plurality of different facsimile devices, the devices repeatedly transfer or automatically continuously call each facsimile device unless the operator terminates the facsimile forward, or paging, function, as the conventional facsimile devices transfer all of the received data by making the call automatically to the telephone number of the pre-registered transmission transfer location(s) regardless of who sent the data.

This occurs many times, for example, when transmission transfer locations or locations for automatic calling are registered between two offices and when the configuration is set which transfers the contents to another office if not available at the desired destination's office and when not available at either place; or when a configuration is made wherein the transmission transfer locations are set such that they form a "loop" among three offices.

SUMMARY OF THE INVENTION

In overcoming these problems, it is an object of the invention to provide a communication device which does not execute unnecessary communication.

To accomplish the objective, the invention relates to a communication device which stores information relating to a specific receiver (or transmission transfer location), calling the receiver stored in a first memory means based on data communications from another communication device, which comprises a second memory means for storing sender's information as sent through a telephone line; a comparison means for comparing the information of the sender stored in the second memory means; and a process means for determining whether the automatic calling should proceed for the specified location stored in the first memory means based upon the results of the comparison by the comparison means.

Therefore, because the determination whether the automatic calling should proceed to the specified transmission transfer location is made based on the results from the comparison of information from the sender that is sent through a line and a telephone number of the transmission transfer location, unnecessary communications are prevented.

BRIEF DESCRIPTION OF THE DRAWINGS

Preferred embodiments of the invention are described in detail hereafter, with reference to the following figures wherein:

FIG. 8 is a block diagram of the facsimile device in the second embodiment;

FIGS. 19, 20A, 20B, 21, 22 and 23 are flowcharts of the built-in mode process of the fourth embodiment.

DETAILED DESCRIPTION OF THE PREFERRED EMBODIMENT

A first embodiment of the invention is described hereafter, with reference to FIGS. 1–7.

Figure 1:
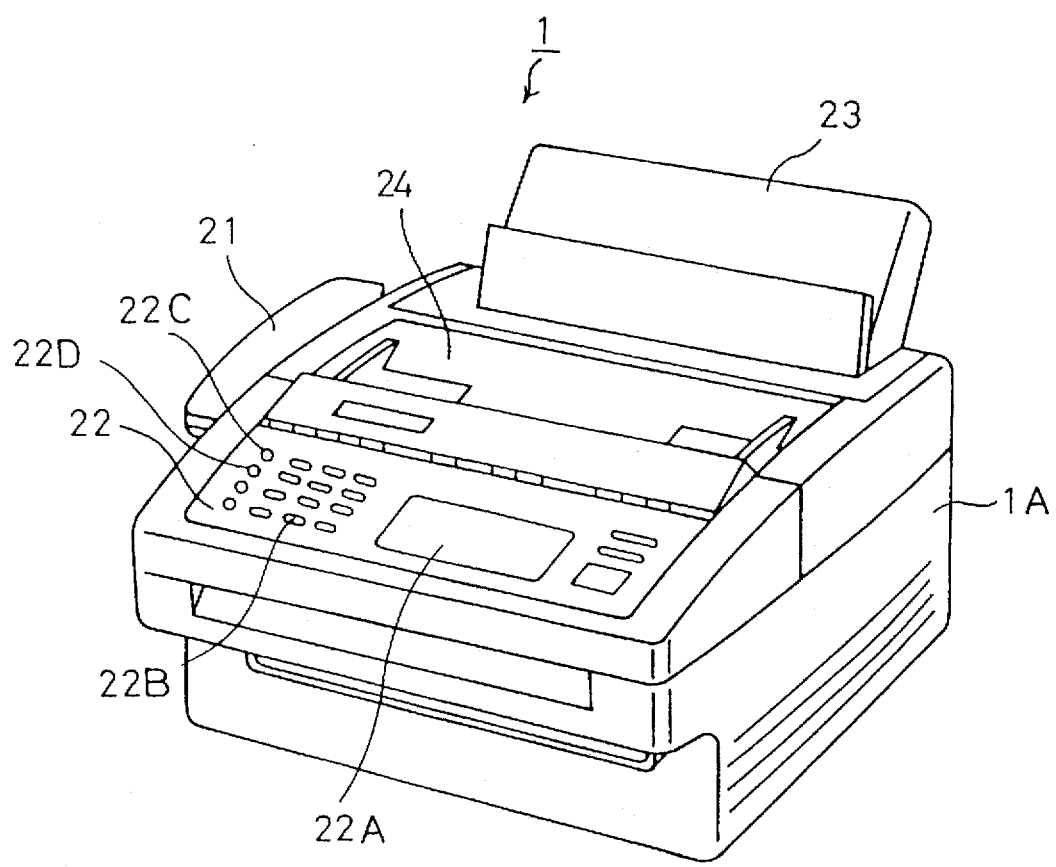
FIG. 1 is a prospective view of the facsimile device in the first through fourth embodiments.
Figure 2:
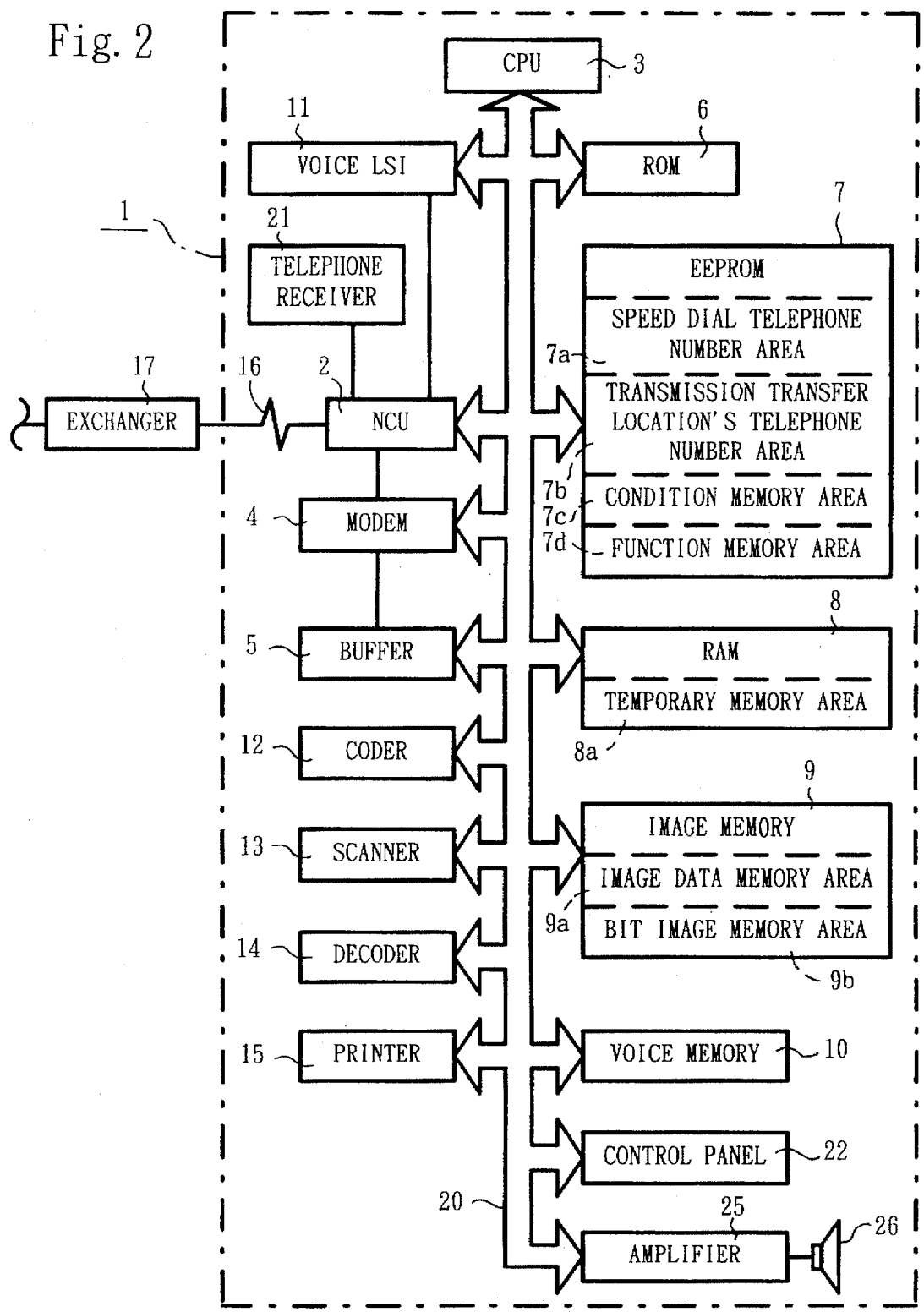
FIG. 2 is a block diagram of the facsimile device in the first embodiment.

FIGS. 1 and 2 show the facsimile of a first embodiment. FIG. 1 is a prospective view and FIG. 2 is a block diagram of the facsimile device.

As shown in FIG. 1, a handset 21 is installed on a side of the body 1a of the facsimile device 1. A control panel 22 is provided at the front part of the top surface of the body 1a. Moreover, at the rear part of the top surface of the body 1a, a cassette installation 23 is formed which is detachable for installing a recording paper cassette (not shown) and at the center of the top surface, a document table 24 is formed.

The facsimile device 1 (FIG. 2) includes a network control unit (referred to as a NCU hereafter) 2, a CPU 3, a modem 4, a buffer 5, a ROM 6, an EEPROM 7, a RAM 8, an image memory 9, a voice memory 10, a voice LSI 11, a coder 12, a scanner 13, a decoder 14, a printer 15, a control panel 22, and an amplifier 25 which are connected through a signal path line 20.

The CPU 3 which is the core of the facsimile device 1 proceeds with facsimile actions or telephone actions, in other words, data communication, by controlling each part of the device connected by the signal path line 20 in accordance with the type of signal sent or received through the NCU 2 for line control.

The modem 4 is for transmitting and receiving various types of signals for controlling the transmission and for transmitting and receiving the image information by modulating and demodulating it respectively. The buffer 5 temporarily stores data, including coded image information, which is sent and received between the facsimiles of the communicating parties. The ROM 6 stores the control program. The EEPROM 7 is a memory for storing various types of setup and related information and includes a specified telephone number area 7a for storing specified telephone numbers for speed dialing, a transmission transfer location's (receiver's) telephone number area 7b (the first memory means) for storing the telephone numbers of the receivers configured during the setup process, and a condition memory area 7c for storing the condition configured in the setup process, a function memory area 7d for storing the functions configured during the setup process. Moreover, the RAM 8 is a memory for temporarily storing various types of data with action procedures and comprises a temporary memory area 8a (the second memory means) for temporarily storing a caller's telephone number received from an exchanger 17.

The image memory 9 (one of the third memory means) comprises a dynamic RAM (DRAM) and includes an image data memory area 9a for storing the image data and a bit image memory area 9b for storing bit images for recording. In addition, the voice memory 10 (one of the third memory means) also comprises a DRAM and stores OGM that are messages sent to the caller and ICM that are incoming messages sent by the caller or callers.

The voice LSI 11 modulates analog voice signals received by the NCU 2 to digital voice signals and modulates digital voice signals, created inside the facsimile device 1, to analog voice signals prior to outputting them to the NCU 2.

The coder 12 codes the transmitted image information and the scanner 13 reads images from documents fed from the document table 24 (FIG. 1). The decoder 14 reads and decodes the received image data written to and stored in the buffer 5 or the image data memory area 9a of the image memory 9 for the purpose of recording. The printer 15 records the received image data onto paper, which can be accomplished, for example, by using an electrostatic electrophotographic recording method which forms latent images in a photosensitive material using a laser beam, develops it by using toner, and transfers it to the paper. In addition, the image data is sent and received as it is coded and compressed by the run-length method, for example.

The control panel 22 permits various types of control by the operator along with displaying the action state of the facsimile device 1 on a display 22a. The control panel 22 comprises a number pad 22b, function keys 22c, mode configuration keys 22d, and the display 22a (FIG. 1). The mode configuration keys 22d are used for setting up a mode from among an automatic receiving mode, a manual receiving mode, a facsimile/telephone switchable mode, and a built-in TAD mode. The amplifier 25 outputs the ringer or replayed ICM through a speaker 26.

Figure 1A:
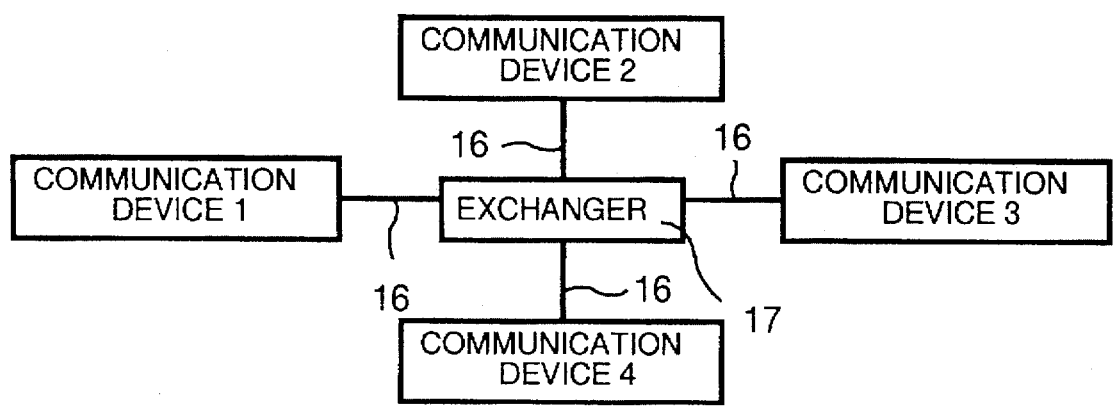
FIG. 1A is a schematic representation of a communication device network.

The facsimile device 1 is connected to a telephone line 16 through the NCU 2. The telephone line 16 is connected to an exchanger 17 and the exchanger 17 is connected to one or more facsimiles 16 or telephones (FIG. 1A) through other telephone lines.

To the facsimile device 1, call signals come from another facsimile or telephone through the exchanger 17 corresponding to the dial control of the other facsimile device or telephone. At this time, if the person who owns the receiving facsimile device 1 is registered with, or has purchased the service from, the exchanger 17 to receive the caller's telephone number, the caller's telephone number (Caller ID) will then be sent to the receiving facsimile device 1 through the exchanger 17 in a no-sound area between the first call signal and the next call signal. Such a system has been used as an analog exchange system in the United States of America.

Next, an explanation is provided of the normal facsimile receiving actions (in which recording is accomplished in real time at the time of receiving the data, the automatic receiving mode having been selected from the mode configuration keys 22d on the control panel 22) by the facsimile device 1.

At the time of normal facsimile receiving, after being connected to another facsimile device (not shown), through the exchanger 17 and the telephone line 16, the facsimile device 1 receives signals by means of a specified communication protocol from the other facsimile device under control of the CPU 3. A specified amount of the image data sent by the other facsimile device is stored to the buffer 5. The image data is normally coded (compressed) when received, and decoded (extracted) by the decoder 14 and is then written to the bit image memory area 9b in the image memory 9 as it is opened to bit images ultimately for printing of one page by the printer 15.

When the bit image is opened to a specified resolution, it is sent to the printer 15, and printed out in single page units. The buffer 5 is cleared after the stored contents are written to the bit image memory area 9b in the image memory 9, and the next specified amount of the image data sent is stored. In addition, the bit image memory area 9b in the image memory 9 is cleared after outputting the data to the printer 15, and the next bit image data is then written to the bit image memory area 9b. By the process described above, the printer 15 sequentially records the communicated contents on the recording paper and all of the communicated contents are printed.

Moreover, at the time of receiving image data, such as at interception, the image data is stored and compressed in the image data memory area 9a in the image memory 9 and, at the time of recording, it is opened as a bit image to the bit image memory area 9b in the image memory 9.

On the other hand, at the time of normal facsimile transmission, the transmitted document is read by the scanner and is sent through the NCU 2 after being coded by the coder 12. Moreover, at the time of memory transmission, the transmitted document is read by the scanner 13, the coded image data is stored to the image data memory area 9a in the image memory, and the transmitting action is then executed at the specified time.

The normal telephone arrival action (an action taken when the manual receiving mode is selected by the mode configuration keys 22d on the control panel 22) at the facsimile device will now be described.

The CPU 3, along with detecting, through the NCU 2, that a ringer signal has been received (e.g. that a communication has arrived), outputs the specified ringer sound through the amplifier 25 and the speaker 26 by linking it to the ringer signals. Then the CPU 3 makes communication with the telephone receiver possible by connecting the telephone line to the NCU 2 as it detects that the telephone receiver has been lifted while detecting the incoming ringer signals.

On the other hand, at the time of a normal outgoing telephone call, the CPU 3 detects, through the NCU 2, that the telephone receiver has been lifted and outputs a selected signal to NCU 2 corresponding to the input from the number pad 22b on the control panel 22. Then the selected signal calls another telephone or facsimile machine (FIG. 1A) from the NCU 2 through the telephone line 16 and the exchanger 17.

Next, an explanation is provided for when the facsimile/telephone switching mode is selected by the mode configuration key 22d on the control panel 22.

In this event, the CPU 3 accomplishes the above described normal facsimile receiving action if it receives the CNG signals with the communication protocol in the facsimile device through the NCU 2, and accomplishes the above described normal telephone transfer action if the telephone receiver 21 is detected as having been lifted through the NCU 2. If the CNG signals have not been received and if a specified time has elapsed in a state where the telephone receiver 21 has not been lifted, then the normal facsimile receiving action is accomplished on the assumption that the communicating component is going to send a facsimile.

Next will be described the case in which the built-in TAD mode has been selected by the mode configuration key 22d on the control panel 22. First, an explanation about how the setup process for the built-in TAD mode in the facsimile device 1 is provided based on the flow chart of FIG. 3.

When the setup, which determines the variations of the built-in TAD mode, is selected by the operator using the function keys 22c on the control panel, the setup process for the built-in TAD mode is commenced.

As the setup process is commenced, first, the specified telephone number area 7a, the transmission transfer location's telephone number area 7b, the condition memory area 7c, and the function memory area 7d of the EEPROM 7 are cleared (Step 100). Then three options, the facsimile-only state, the telephone-only state, and the state of sharing the facsimile and the telephone are displayed in the display 22a on the control panel 22, and a determination is made whether one of the options has been selected (Step 101). If there has been no selection (NO at Step 101), the program waits until a selection is made. On the other hand, if one of the options has been selected (YES at Step 101), the selection is stored in the condition memory area 7c in the EEPROM 7 (Step 103).

Then the three functions, namely the paging function, the facsimile forward function, and the message forward function are displayed on the display 22a on the control panel 22, and a determination is made whether one of the functions has been selected (S105). The paging function is the function of transmitting a calling signal by automatically calling the transmission transfer location's telephone number; the facsimile forward function is the function of transferring to the transmission transfer location's telephone number the image data stored in the image data memory area 9a in the image memory 9; and the message forward function is the function of transferring to the transmission transfer location's telephone number the contents of an ICM stored in the voice memory 10.

If one of the three functions has not yet been selected (No at S105), the program waits until the selection is made. On the other hand, if one of the three functions has been selected (YES at S105), the selected function is stored in the function memory area 7d in the EEPROM 7 (S107). At that time, if the facsimile-only state is stored in the condition memory area 7c in the EEPROM 7, the message forward function cannot be selected. Moreover, if the telephone-only state is stored in the condition memory area 7c, the facsimile forward function cannot be selected. Furthermore, if the telephone-only state is stored in the condition memory area 7c and if the OGM has not been recorded in the voice memory 10, an error message will be shown in the display 22a.

Then, a determination is made whether a transmission transfer location's telephone number has been input using the number pad 22d on the control panel 22 (S109). If the transmission transfer location's telephone number has not yet been input (NO at S109), the program waits until the input is accomplished. On the other hand, if the transmission transfer location's telephone number has been input (YES at S109), the telephone number is stored in the transmission transfer location's telephone number area 7b in the EEPROM 7 (S111). A plurality of transmission transfer location's telephone numbers can be input.

The built-in TAD mode process will now be described using the flow charts of FIGS. 4A to 7.

Figure 3:
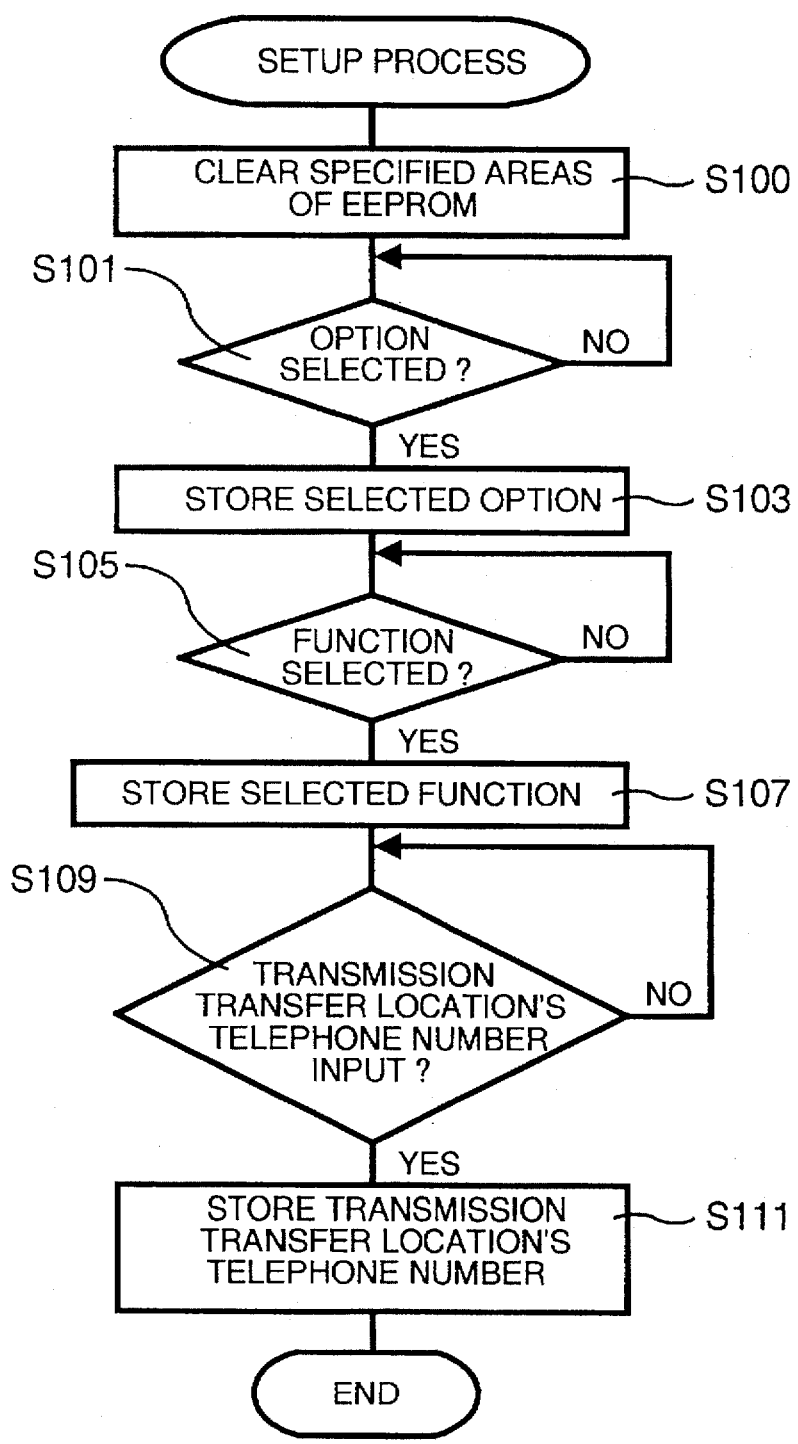
FIG. 3 is a flow chart of the setup process of the built-in TAD mode in the first and second embodiments.

The built-in TAD mode process is commenced by selecting the TAD mode using the mode configuration key 22d on the control panel 22 and is executed using the contents of the setup process (FIG. 3).

Figure 4A:
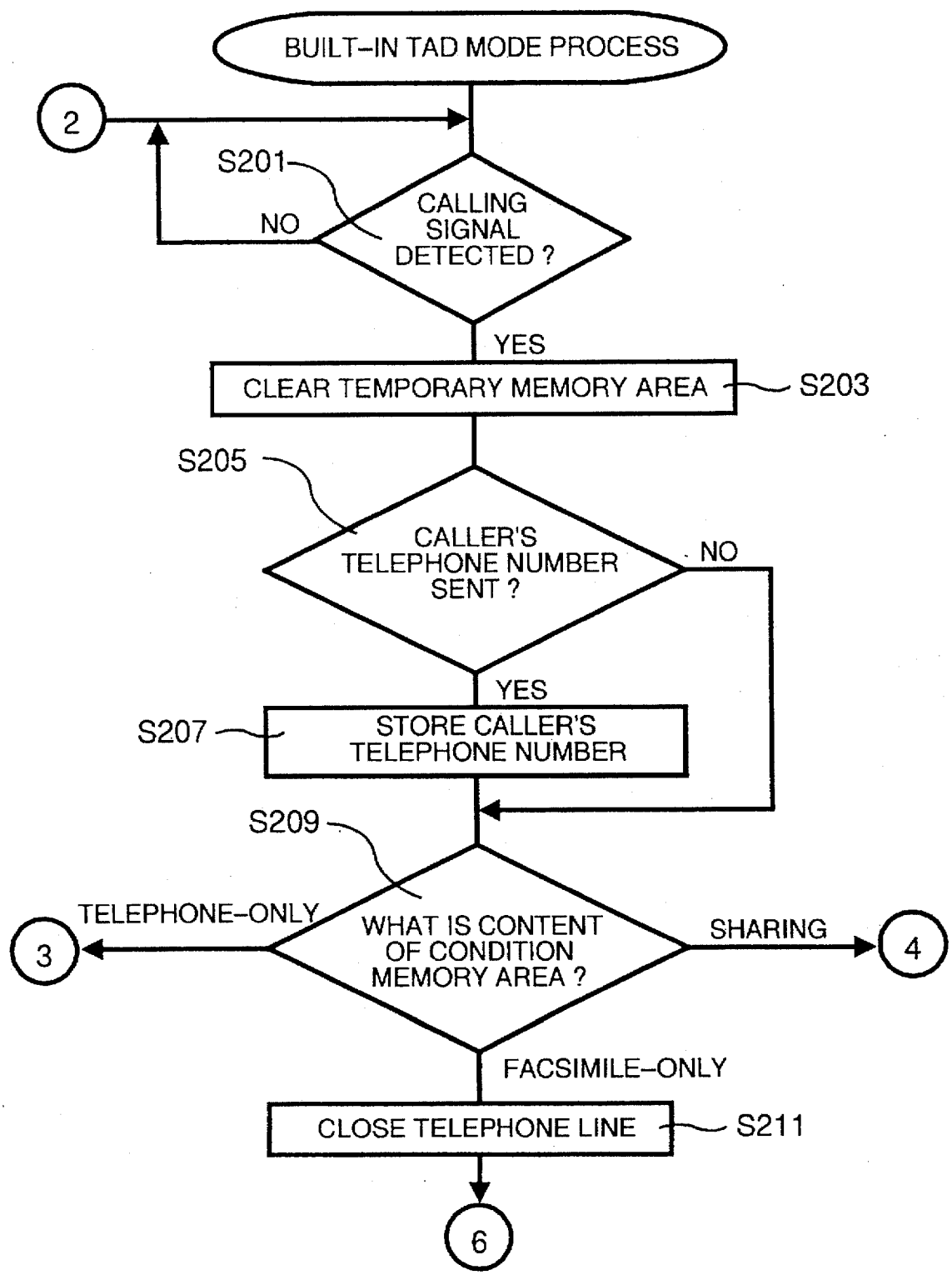
FIGS. 4A, 4B, 5, 5A, 6 and 7 are flow charts of the built-in TAD mode process of the first embodiment.
Figure 4B:
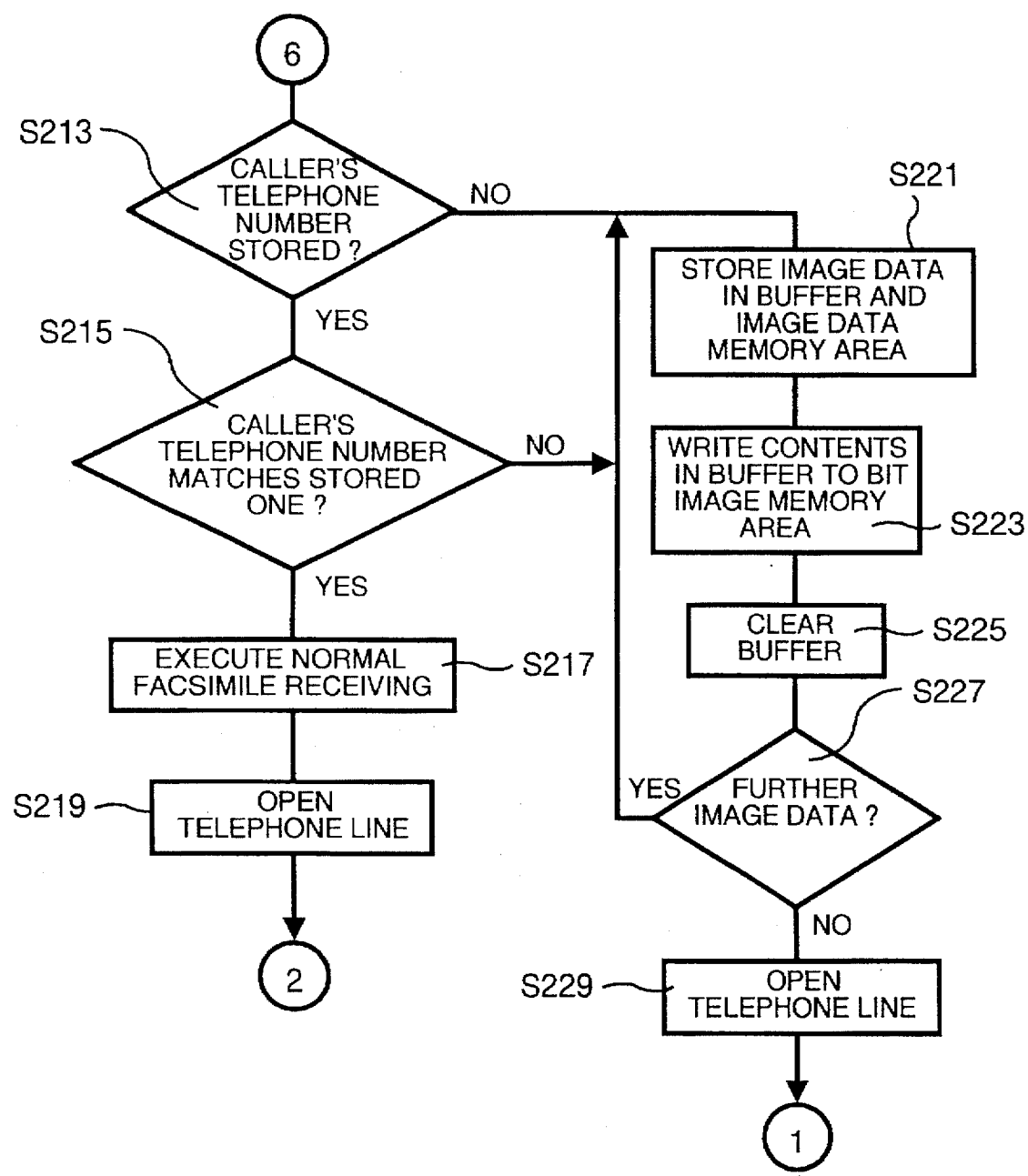

As shown in FIGS. 4A,4B, a determination is made whether a calling, or incoming, signal has been detected (S201). If a calling signal is not detected (NO at S201), the program waits until such a signal is detected. If a calling signal is detected (YES at S201), then the temporary memory area 8a in the RAM 8 which stores a caller's telephone number (S203) is cleared. A determination is then made whether the caller's telephone number has been sent from the exchanger 17 at the time (S205). If the caller's telephone number is not sent from the exchanger 17 (NO at S205), the program proceeds to step S209. If the caller's telephone number is sent from the exchanger 17 (YES at S205), the caller's telephone number is stored in the temporary memory area 8a in the RAM 8 (S207) and then the program proceeds to step S209.

Figure 5:
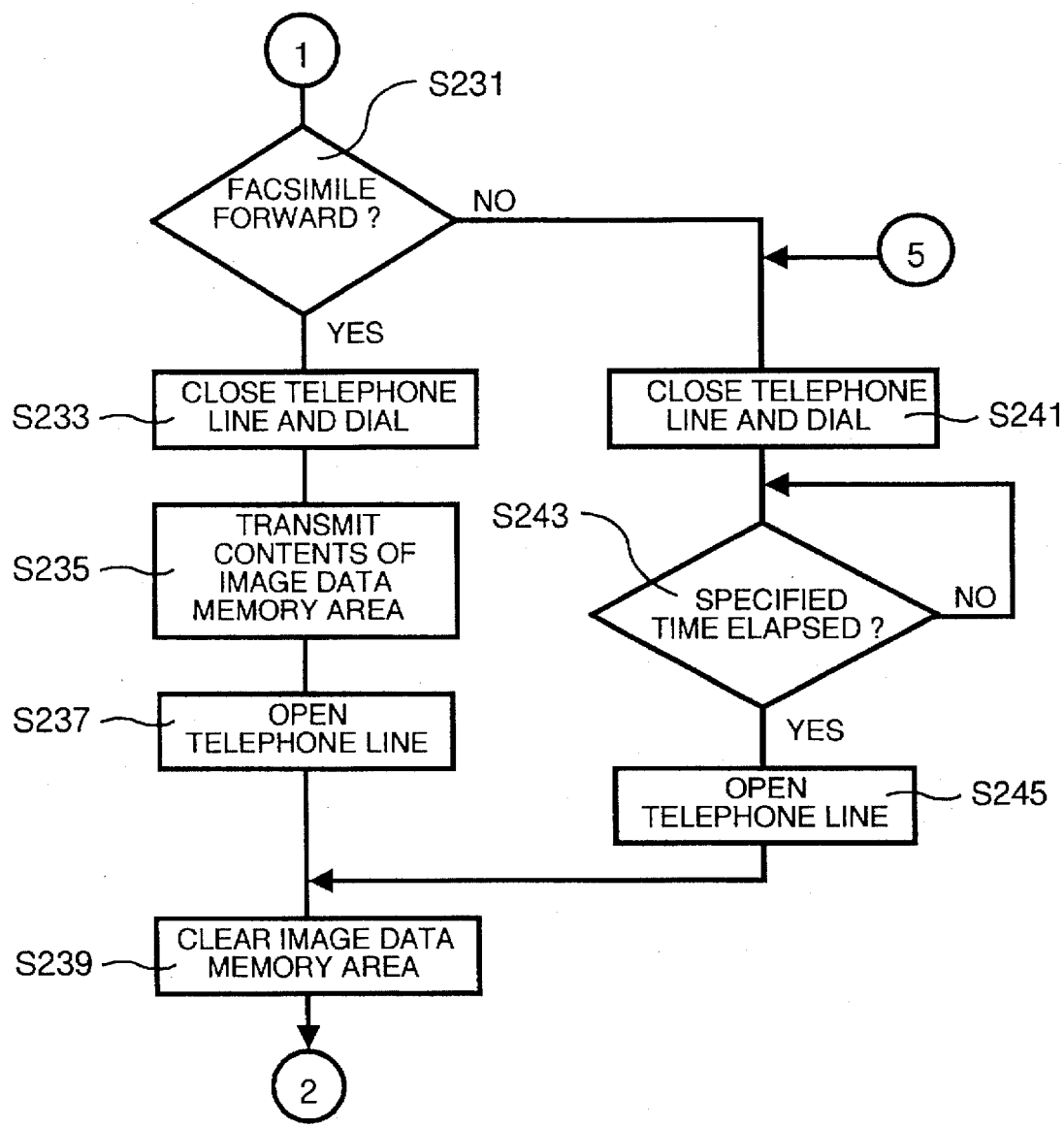

At step S209, the contents of the condition memory area 7c in the EEPROM 7 are searched and a determination is made whether the state of sharing the facsimile and the telephone, telephone-only or facsimile-only is configured. If the contents of the condition memory area 7c is the facsimile-only state at step S209, the process shown in steps S211 to S245 of FIGS. 4A,4B and 5 is executed.

In other words, first the telephone line is closed, i.e., a connection is made for transmission, (S211), and a determination is made whether the caller's telephone number has been stored in the temporary memory area 8a in the RAM 8 (S213). At step S213, if the caller's telephone number has been stored in the temporary memory area 8a (YES at S213), a determination is made whether the caller's telephone number matches one stored in the transmission transfer location's telephone number area 7b in the EEPROM 7 (S215). If they do not match (NO at S215), only the specified amount of the image data sent from the calling facsimile device (not shown in the drawing) is stored in the buffer 5 and the image data memory area 9a in the image memory 9 (S221).

Then the contents stored in the buffer 5 are decoded by the decoder 14 and are written to the bit image memory area 9b in the image memory 9 after being opened as a bit image (S223). The stored contents of the buffer 5 are then cleared (S225). Then a determination is made whether there is further image data being sent from the calling facsimile device (S227). If there is (YES at S227), the procedure returns to step S221 and the next specified amount of the image data sent is stored in the buffer 5 and the image data memory area 9a in the image memory 9, followed by steps S223-S227. On the other hand, if there is no further image data being sent from the calling facsimile device at step S227 (NO at S227), the telephone line will be opened, i.e., the connection with the facsimile sender will be terminated (S229).

By the process of steps S221 to S229, the communicated contents are continuously stored by the specified amount in the image data memory area 9a in the image memory 9, and eventually all of the transmitted data are stored. Moreover, at step S223, the data written in the bit image memory area 9b in the image memory 9 are continuously output to the printer 15. Therefore, the printer 15 eventually prints all of the transmitted data.

After the process at step S229, a determination is made whether the content stored in the function memory area 7d in the EEPROM 7 are the facsimile forward function (S231 of FIG. 5). At step S231, if the contents stored in the function memory area 7d in the EEPROM 7 are the facsimile forward function (YES at S231), after closing, i.e. connecting with, the telephone line, the transmission transfer location's telephone number stored in the transmission transfer location's telephone number area 7d in the EEPROM 7 is automatically dialed (S233).

After confirming that the facsimile device at the transmission transfer location has received the call by receiving signals from the communication protocol, the image data (all of the originally transmitted data) stored in the image data memory area 9a in the image memory 9 is sent to the stored transmission transfer location(s) (i.e. the data received from a first facsimile device is sent to a third facsimile device by the intermediate second facsimile device) (S235). The telephone line is opened (S237) thereafter, the image data memory area 9a in the image memory 9 is cleared (S239), and the procedure returns to step S201 again.

On the other hand, if the function stored in the function memory area 7d in the EEPROM 7 is not the facsimile forward function (NO at S231), then it is the paging function because this is the facsimile only state. Thus, after closing the telephone line, the transmission transfer location's telephone number, from the transmission transfer location's telephone number area 7b in the EEPROM 7, is automatically dialed (S241), and the calling signal is continually sent for a specified time (S243). After the time has elapsed (YES at S243), the telephone line is opened (S245), the image data memory area 9a in the image memory 9 is cleared (S239), and the procedure returns to step S201.

In addition, if a caller's telephone number is not stored in the temporary memory area 8a of the RAM 8 at step S213 (NO at S213), the procedure also proceeds to step S221.

On the other hand, if the caller's telephone number, stored in the temporary memory area 8a, matches the one stored in the transmission transfer location in telephone number area 7b (YES at S215), then the receiver to whom the received image data is to be sent is the same person/location from which the image data has been received. Thus, the same image data received would be sent back to the sender as a meaningless transmission. Therefore, in that case, normal facsimile receiving actions are executed (S217), the telephone line is opened (S219), then the procedure returns to step S201.

Figure 5A:
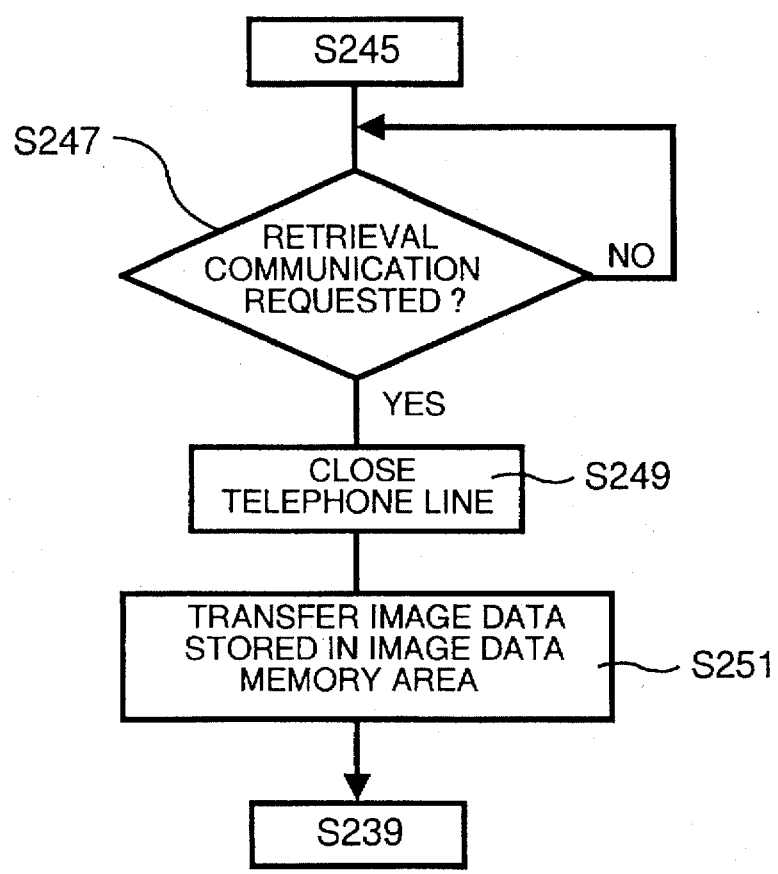

In addition, when the paging function is set (NO at S231), and after the telephone line is opened at step S245, the following process (see FIG. 5A) may be executed before the image data memory area 9a is cleared at step S239. That is, a determination may be made whether remote controlling from the receiver telephone number which was automatically called (i.e. a retrieval communication) has been requested. If there is no request to proceed with the remote control, the program waits until the request is received. If there is a request for remote control, the telephone line is maintained in a closed state, and the data stored in the image data memory area 9a in the image memory 9 (contents of the communication) are transferred. After the completion of the transfer, the telephone line is opened and the process at step S239 is executed.

Figure 6:
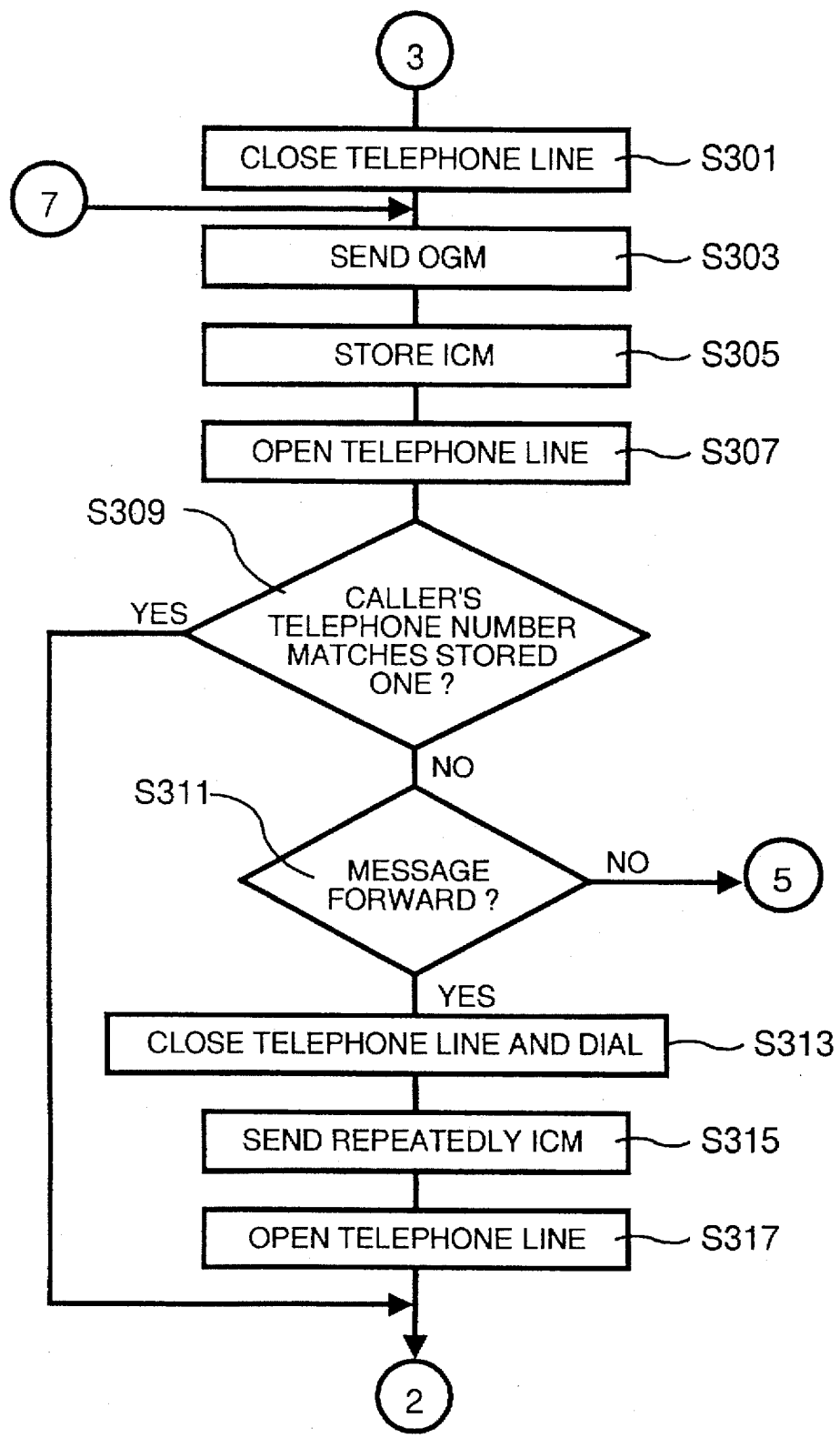

Next, at step S209 in the flow chart of FIGS. 4A,4B, the process shown in steps S301-S317 of FIG. 6 is accomplished if the stored state in the state memory area 7c is the telephone-only state.

In other words, the telephone line is closed (S301), and the OGM stored in the voice memory 10 is sent to the caller (S303). Then the ICM from the caller is stored in the voice memory 10 (S305), and the telephone line is opened (S307). After that, a determination is made whether the caller's telephone number stored in the temporary memory area 8a matches a telephone number stored in the transmission transfer location's telephone number area 7b (S309). If there is no match (NO at S309), then a determination is made whether the function stored in the function memory area 7d is the message forward function (S311). If the stored contents of the function memory area 7d is the message forward function (YES at S311), then, after closing the telephone line, the transmission transfer location's telephone number, as stored in the transmission transfer location's telephone number area 7b, is automatically called (S313) and the ICM stored in the voice memory 10 is repeatedly sent to the transmission transfer location for a specified number of times (S315). By so doing, without confirming that the transmission transfer location has picked up the handset, the contents of the ICM can be transferred to that location. The line is opened thereafter (S317) and the process returns to step S201.

On the other hand, if the stored function in the function memory area 7d is not the message forward function (NO at S311), the function is the paging function, the only other allowable function for the telephone-only state, and the process described commencing with step S241 of FIG. 5 is executed.

In addition, if the caller's telephone number has not been stored in the temporary memory area 8a, then NO is also the result at step S309.

On the other hand, if at step S309, the caller's telephone number is stored in the temporary memory area 8a and matches the telephone number stored in the transmission transfer location's telephone number area 7b (YES at S309), the routine returns immediately to step S201.

The process at the step S309 corresponds to the process of the comparison means in the invention and the process of steps S313 to S317 correspond to the process of the process means in the invention.

Figure 7:
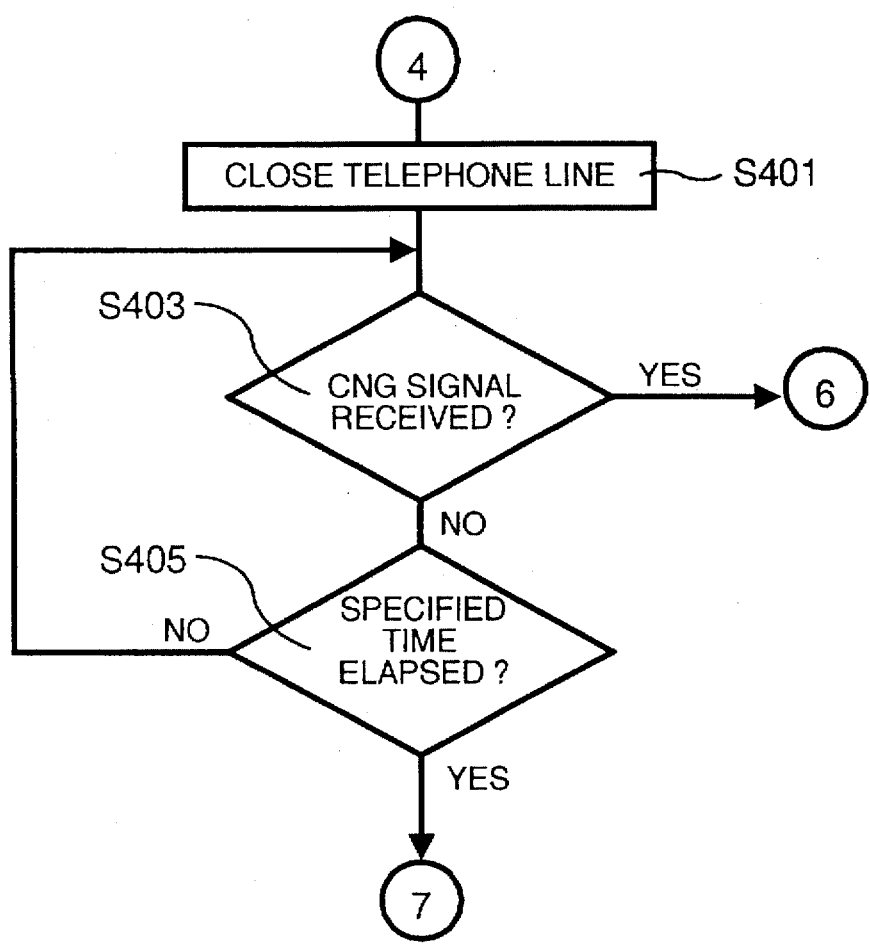

Next, at step S209 of the flow chart shown in FIGS. 4A,4B, if the stored state in the state memory area 7c is the facsimile/telephone sharing state, the process of steps S401 to S405, shown in FIG. 7, is accomplished.

The telephone line is closed (S401) and a determination is made whether the receiver has received the CNG signals which indicate that a facsimile transmission is coming (S403). If the receiver has received the CNG signals (YES at S403), the process commencing with step S213 (FIGS. 4A,4B) will be accomplished. On the other hand, if the receiver does not receive the CNG signals (NO at S403), a determination is made whether a specified time has elapsed (S405). If the time has not elapsed (NO at S405), the procedure returns to S403 and, if the time has elapsed (YES at S405), an assumption is made that the caller is sending a voice message and the process commencing with step S303 in FIG. 6 is executed.

According to the facsimile device 1 described above, in the setup process for the built-in TAD mode, if the transmission transfer (forwarding) location telephone number is configured along with configuring either the facsimile-only state or the facsimile/telephone sharing state, only when the necessary facsimile has been sent, the paging (automatic calling only) or the facsimile forward (automatically calls and transfers the contents of the facsimile) is accomplished to the transmission transfer location's telephone number. Thus, unnecessary communication, such as transferring back to the sender the facsimile sent by the sender will not occur.

Moreover, in the setup process for the built-in TAD mode, if the transmission transfer location telephone number is configured as being in the telephone-only state or facsimile/ telephone sharing state, only when the necessary voice data has been sent from a first device, is the paging (automatic calling only) or the message forward (automatically calls and transfers the ICM) executed to the transmission transfer location telephone number. Thus, unnecessary communications such as transferring the sender a message sent by him/herself will not be done.

Therefore, for example, if B is configured as a transmission transfer location at A's facsimile device, A is configured as a transmission transfer location at B's facsimile device, and the image data is sent from C's facsimile device to A's facsimile device; and if the image data is also sent from C's facsimile device to B's facsimile device, then it will be sent from B's facsimile device to A again (and from A to B). At this time, since the facsimile device sending the image data and the facsimile device configured as a transmission transfer location at A's facsimile device are both B, and vice versa, the image data will not be again sent from A to B or B to A, and unnecessary communications (automatic calling or transferring of the originally transmitted data) will not be executed.

Furthermore, in the setup process for the built-in TAD mode, if the facsimile forward function or the message forward function is configured, data of a facsimile or telephone call from a sender, or caller, can be identified when received as new data, and a response can be provided quickly based on the data.

In addition, in the setup process for the built-in TAD mode, when the facsimile forward function is configured, because only effective information from the sender is transferred, unnecessary recording paper is not used at the receiver's facsimile device. In addition, even if the telephone line to the facsimile device 1 is closed to send unnecessary information and if truly useful information is sent to the facsimile device, the problem of not being able to respond immediately will be solved.

In addition, the invention can be accomplished in various ways without exceeding the scope of the described first embodiment.

For example, in the embodiment, the object which was compared to the telephone number stored in the transmission transfer location's telephone number area 7b was the caller's telephone number (CALLER ID) sent from the exchanger 17. However, the caller's telephone number can be included in the transmitting terminal recognition signals, sent as TSI signals, and compared while being received by the communication protocol. In that case, the process of steps S205 and S207 (FIG. 4) is accomplished after step S211.

Moreover, in the embodiment, the determination is made whether automatic calling is made by comparing the caller's telephone number sent from the exchanger 17 and the transmission transfer location's telephone number to whom the data or page is going to be transferred. However, when a system is used in which the caller's name is also sent from the exchanger 17, a determination may be made whether automatic calling is made to the caller's telephone number by storing the caller's name and telephone number in advance and by comparing that caller's name and the name of a caller sent from the exchanger 17.

Furthermore, when the facsimile forward function is configured in the setup process for the built-in TAD mode, during the process of steps S221 to S227 (FIG. 4), selection may be made to the effect that the image data being sent from the sender is just stored in the image data memory area 9a and is not printed by the printer 15.

Next the second embodiment will be described. The structure and actions of the second embodiment which are the same as the first embodiment are omitted. For some of the description, the drawings of the first embodiment are referred to for the second embodiment.

The facsimile device of the second embodiment (FIG. 8) is structured substantially similar to that of the first embodiment (FIG. 2). However, the control program stored in the ROM 6 is different from the control program in the first embodiment in order to perform a function characteristic of the second embodiment. In addition, the temporary memory area 80a temporarily stores not only the caller's telephone number, sent from the exchanger 17, but also a plurality of communication control data including the communication beginning time, the ending time, the communicating time, sender/receiver's name, and/or similar identifying data. The temporary memory area 80a is used for outputting the communication control report which is automatically recorded on paper by the printer 15 at a specified time, such as every 24 hours.

The normal facsimile receiving action and the normal facsimile transmitting action are substantially the same as the actions of the first embodiment. However, when transmitting and receiving a facsimile is completed, the communication control data, such as receiver/sender's name or the data identified above, is stored in the temporary memory area 80a.

The normal transmitting and receiving actions using the telephone are the same as the actions in the first embodiment. In addition, the actions when the facsimile/telephone switching mode is selected, using the mode configuration key 22d on the control panel 22, are the same as the actions in the first embodiment.

The actions when the built-in TAD mode of the second embodiment is selected using the mode configuration key 22a on the control panel 22 will now be described.

First, the setup process for the built-in TAD mode at the facsimile device 1 is the same as the actions for the first embodiment shown in the flow chart of FIG. 3.

The built-in TAD mode process will be explained using the flow charts of FIGS. 9A to 12.

Figure 9A:
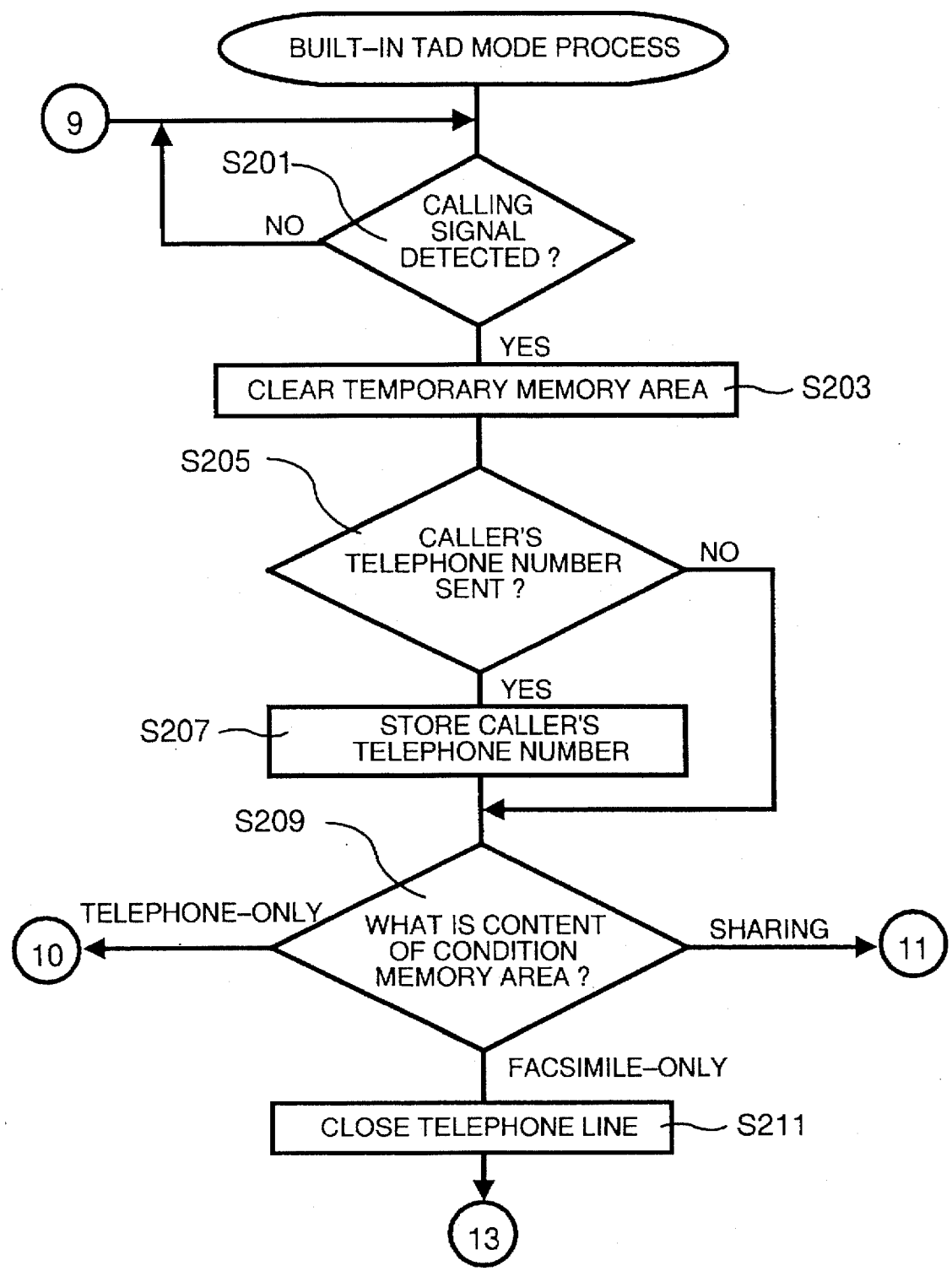
FIGS. 9A, 9B, 10, 11 and 12 are flow charts of the built-in TAD mode process of the second embodiment.
Figure 9B:
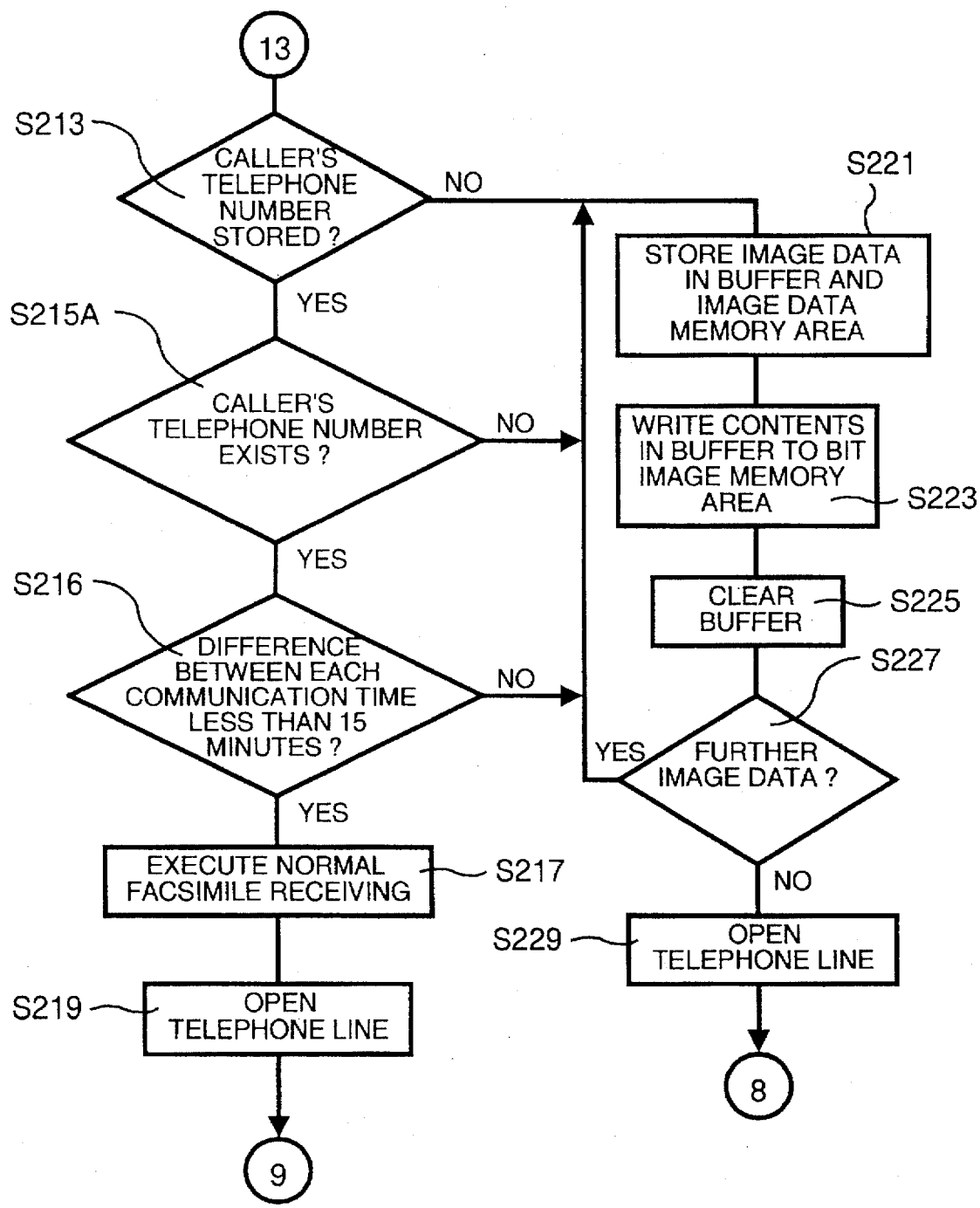
Figure 10:
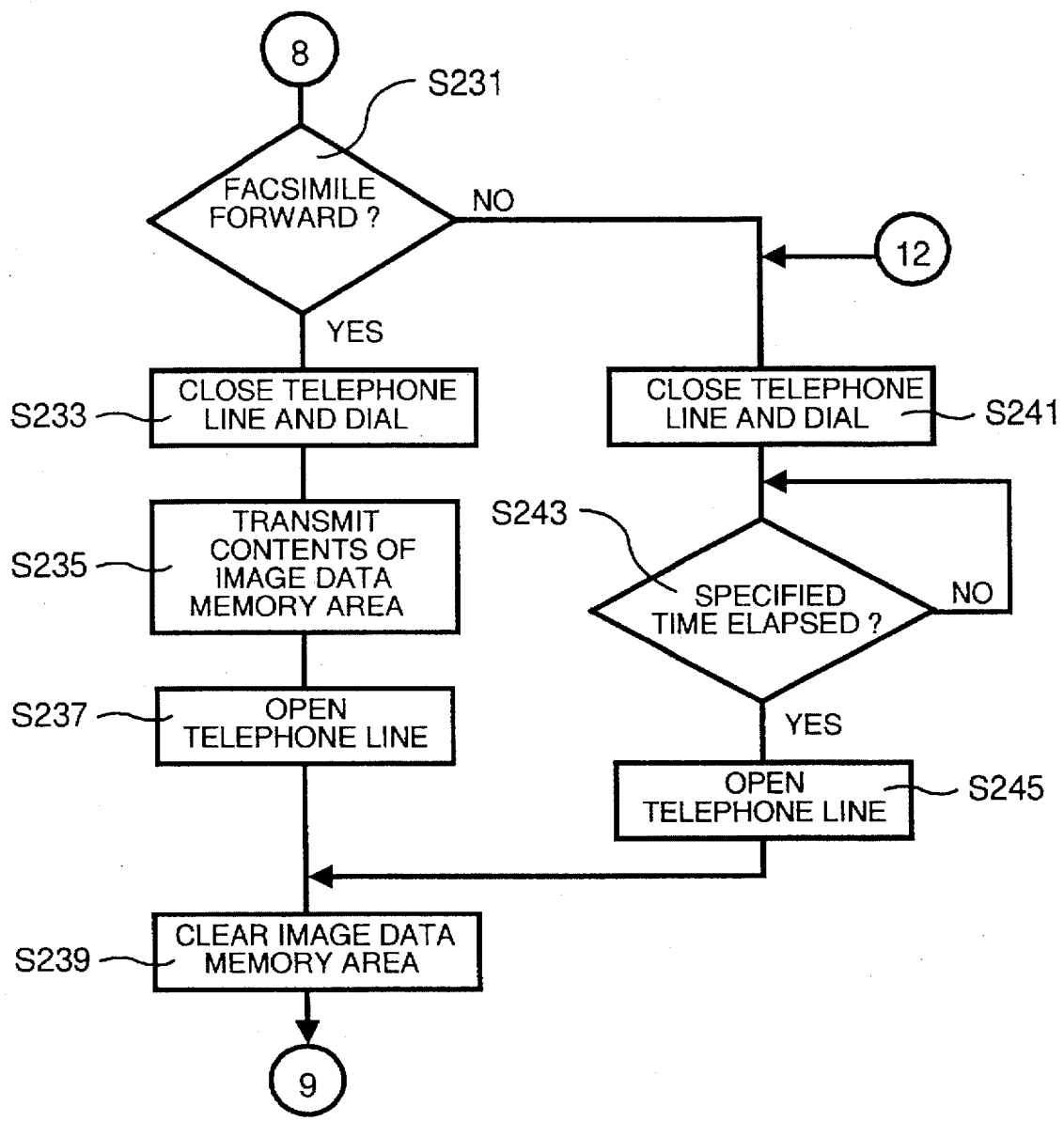

As shown in FIGS. 9A,9B and 10, the processes from steps S201 to S213 and from steps S217 to S245 are the same as the processes in the first embodiment, shown in FIGS. 4A,4B and 5.

As shown in FIG. 9A,9B, if the caller's telephone number is stored in the temporary memory area 80a at step S213 (YES at S213), the determination is made whether the telephone number matches a caller's telephone number that exists in the control data previously stored in the temporary memory area 80a (S215A). If a match exists (YES at S215A), a determination is made whether the difference between the communication beginning time of the current call and the beginning time of the previous communication from the telephone number that matched at step S215A is less than 15 minutes. If the difference exceeds 15 minutes (NO at S216), the specified amount of the image data being sent from the calling facsimile device (not shown) is stored in the buffer 5 and the image memory area 9a (S221).

Moreover, if the currently calling telephone number does not match a telephone number that exists in the control data stored in the temporary memory area 80a at step S215A (NO at S215A), the process goes to step S221. Also if the currently calling telephone number has not been previously stored in the temporary memory area 80a, as determined at step S213, the process goes to step S221.

When the time between each communication, or call, from the same device based on telephone numbers, is determined to be less than 15 minutes at step S216 (YES at S216), a determination is made that the image data once transferred was transferred again through another facsimile device, and thus the transfer of the image data is a meaningless transmission. However, in that case, the normal facsimile receiving action described above is accomplished (S217), the telephone line is opened thereafter (S219), and the process returns to step S201 again.

The receiving action at step S217 could be eliminated because the data transferred comprises data which had already been received. However, it is used as a confirmation process for confirming if the transferred image data differs from the image data that had been previously received.

Next, if the stored state in the condition memory area 7c is the telephone-only state at step S209 of FIGS. 9A,9B, the process of steps S301 to S317 (FIG. 11) is executed. The processes of steps S301 to S307 and steps S311 to S317 are the same as the processes of the first embodiment shown in FIG. 6.

Figure 11:
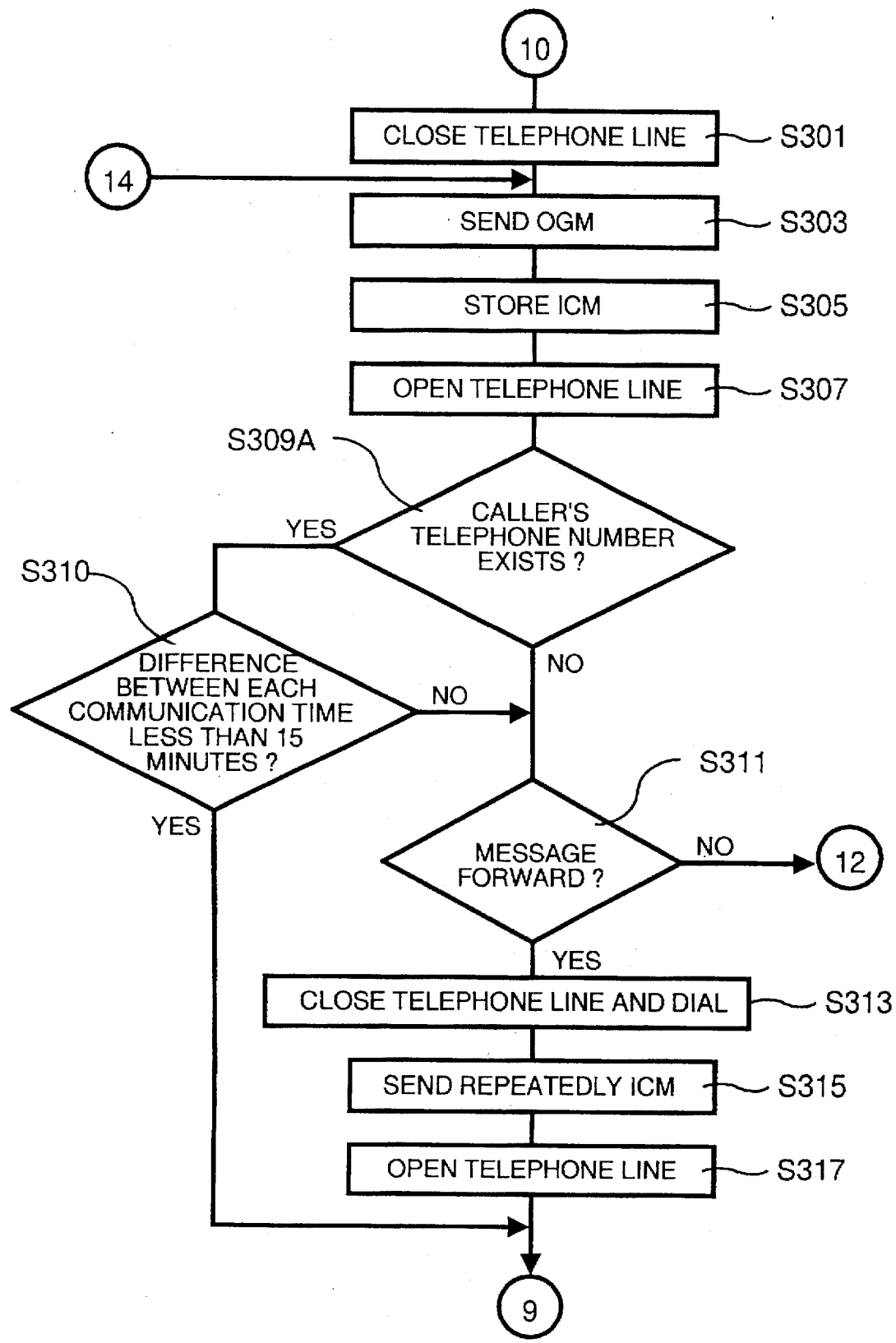
Figure 12:
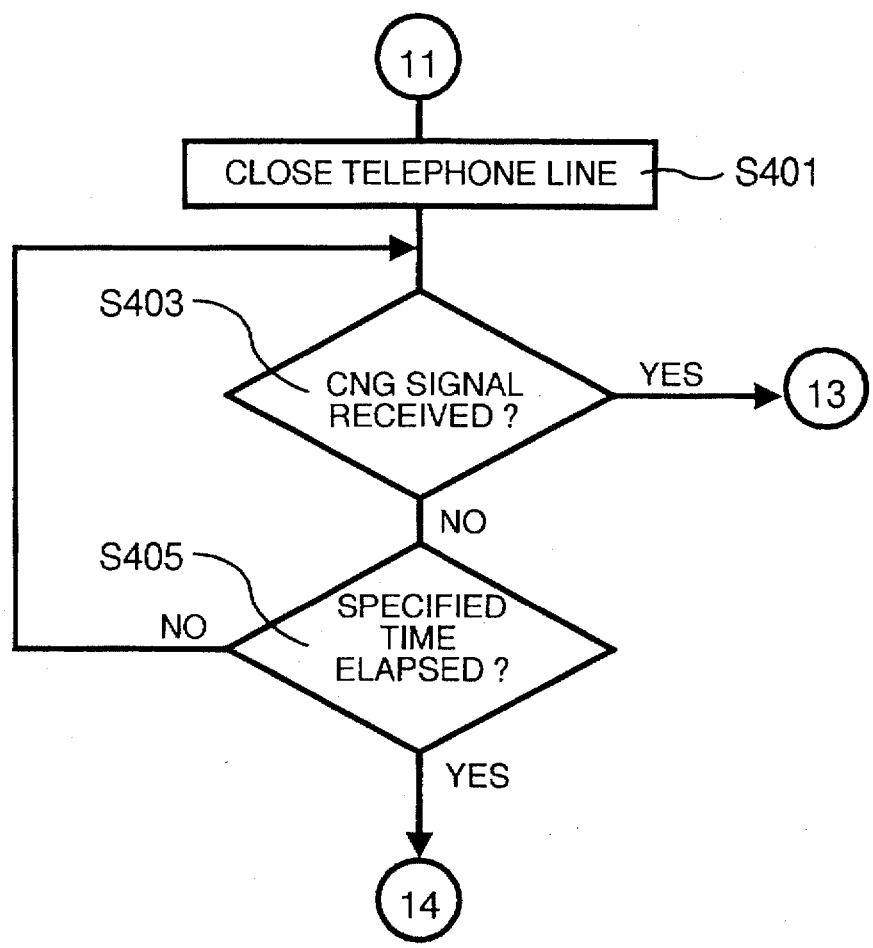

However, as shown in FIG. 11, a determination is made at step S309A whether a telephone number that matches the caller's telephone number exists in the control data stored in the temporary memory area 80a. If a match occurs (YES at S309A), the difference between the communication beginning time of the present call and the beginning time of the previous communication from the telephone number matched at step S309A is calculated and a determination is made whether the difference in time is less than 15 minutes (S310). If the difference exceeds 15 minutes (NO at S310) or if a telephone number that matches the current caller's telephone number does not exist in the control data stored in the temporary memory area 80a at step S309A (NO at S309A), a determination is made whether the function stored in the function memory area 7d is the message forward function (S311).

On the other hand, if the determination is made that the time between each communication is less than 15 minutes at step S310 (YES at S310), the process returns to step S201.

Therefore, if, for example, device B is identified in memory as a transmission transfer location at A's facsimile device, C is identified in memory as a transmission transfer location at B's facsimile device, and A is identified in memory as a transmission transfer location at C's facsimile device, when image data is sent from D's facsimile device to A's facsimile device, if the image data is transferred to B's facsimile device, the image data will be the transferred to C's facsimile device by B's facsimile device. In addition, the image data will be transferred again to A's facsimile device by C's facsimile device.

Even though the action is repeated, when the image data is transferred again from A's facsimile device, the image data is determined as being the image data sent by the same original location. Since the transfer will not be made again if the time between the communications for those two times is calculated to be less than 15 minutes, the same data will not be sent repeatedly anymore, and unnecessary communications (automatic calling or transferring of the communicated contents) will not be performed.

In the embodiment, the telephone number which is stored in the temporary memory area 80a was the caller's telephone number (CALLER ID) sent from the exchanger 17. However, without limiting to thus, it can be the caller's telephone number included in the transmission terminal recognition signals being sent as TSI signals while receiving signals from the communication protocol. In that case, the processes at steps S205 and S207 are accomplished after step S211.

In addition, the time between each communication is determined at steps S216 and S310 based on the communication starting time. However, the time between each communication may be based on the communication ending time or a combination of the communication ending time and the communication starting time.

Moreover, because not only the time between communications at steps S216 and S310 is within 15 minutes, but also the time required to send a facsimile once varies depending on the capability of the facsimile device, resolution at the time of sending, data compression rate, the number of pages sent and related transmission factors, the facsimile device may be such that the operator of the facsimile device can configure the device to accommodate these elements or may set the device up so that the time is selected automatically.

Further, in the embodiment described above, even though the device(s) are effectively utilized when the receiver is set up so that loops are formed between three or more facsimile devices, the present system can be used when receivers are set up between two facsimile devices.

A third embodiment which makes a different use of the second embodiment will now be described. The common structures and actions with the second embodiment are omitted, and the drawings for the second embodiment are referred to for the common drawings.

Figure 13:
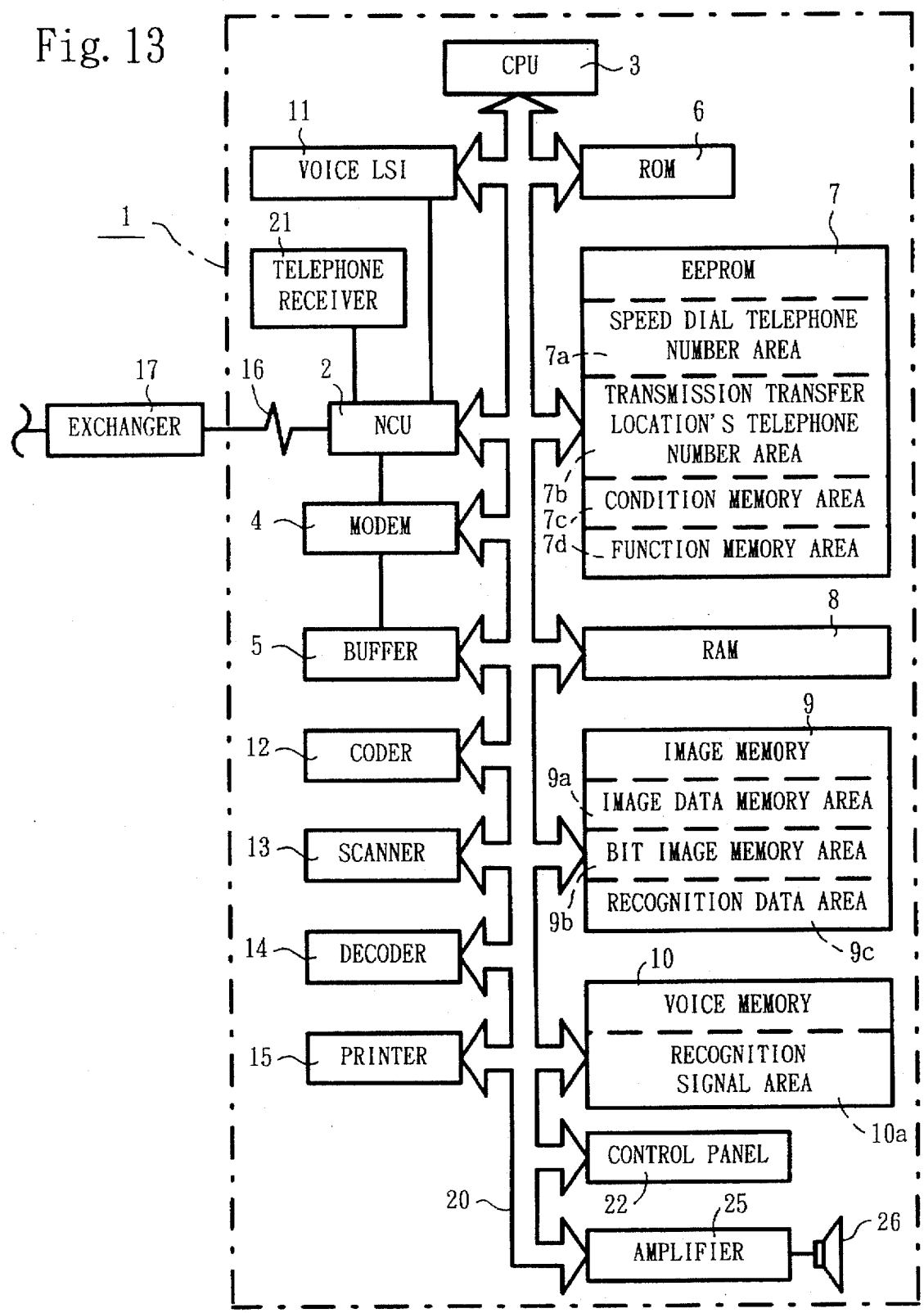
FIG. 13 is a block diagram of the facsimile device in the third embodiment.

The facsimile device in the third embodiment is structured substantially the same as the second embodiment as shown in FIGS. 1 and 13. However, a recognition area 9c which stores a pattern of recognition data for recognizing that the received data is the image data transmitted from a given device, is established in the image memory 9. In addition, in the voice memory 10, a recognition signal 10a is established which stores a recognition signal at a specified frequency for recognizing that the received data is the voice data transmitted from the given device. Moreover, a recognition process program is stored in ROM 6 which determines whether a recognition signal exists in the voice data by filtering the voice data that was sent from another device.

In this embodiment, temporary memory area 80a is not required as the recognition data are used to determine prior receipt of the communication.

In the third embodiment, when transmitting the image data, the recognition data indicating that the received data was the data transmitted from the initial device is transmitted by being attached to the image data being transmitted. The image data is received by the receiver in a state where the recognition data is attached to the image data. Therefore, when this image data is sent through other facsimile devices, it can be determined whether the data was previously transmitted from the original facsimile device if the CPU can determine whether the recognition data is attached. Then, if the recognition data is included in the received image data, accomplishment of the transfer of the received image data or the paging function is terminated.

In addition, in the third embodiment, at the transmission of the voice data, as with the transmission of the image data described above, the recognition signal at a specified frequency indicating that the received voice data was the data transmitted from an originating device is transmitted by attaching it to the voice data being transmitted. Then, if the recognition data at the specified frequency is included in the received voice data, accomplishment of the transfer of the received image data or the paging function is terminated.

Figure 14A:
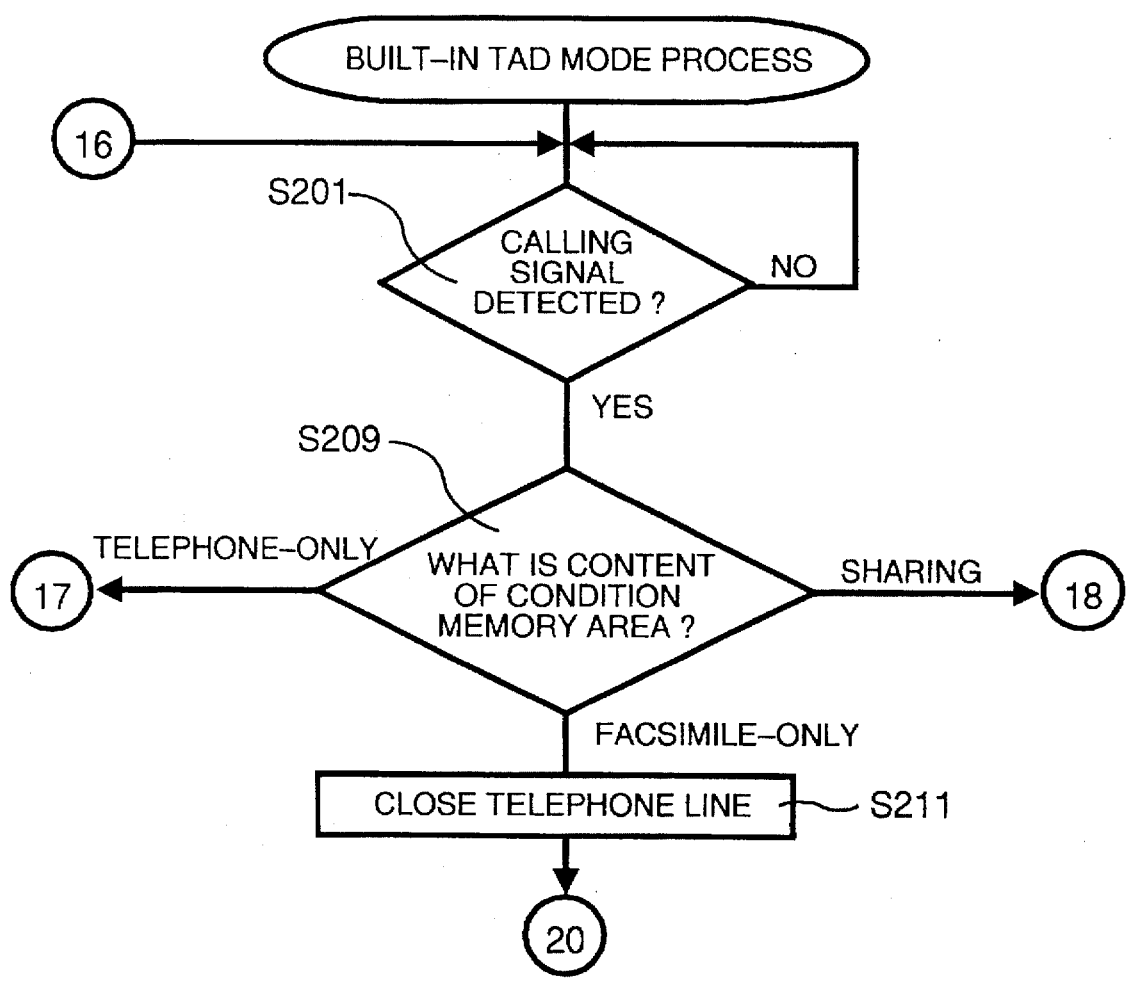
FIGS. 14A, 14B, 15, 16 and 17 are flowcharts of the built-in TAD mode process of the third embodiment.
Figure 14B:
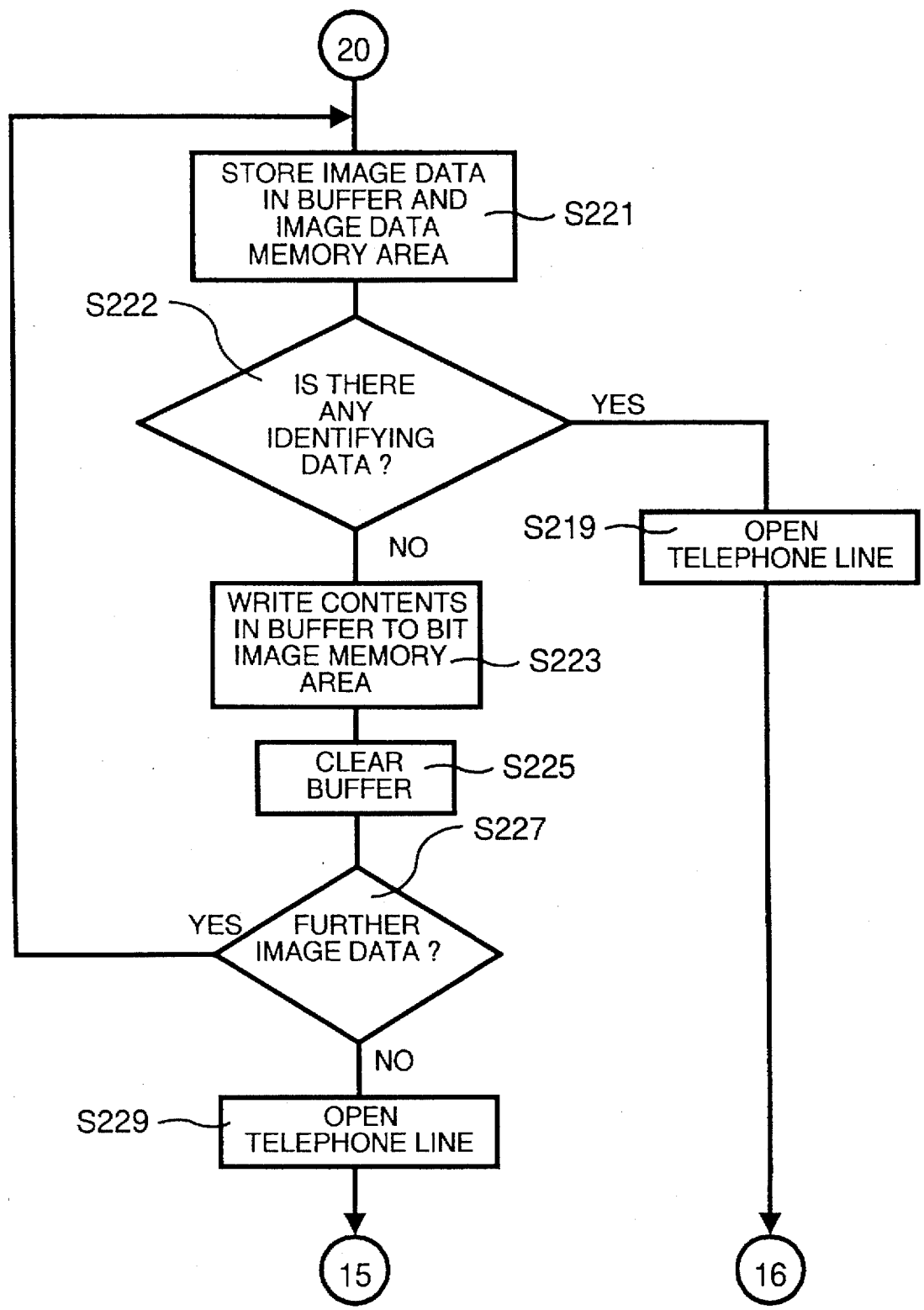
Figure 15:
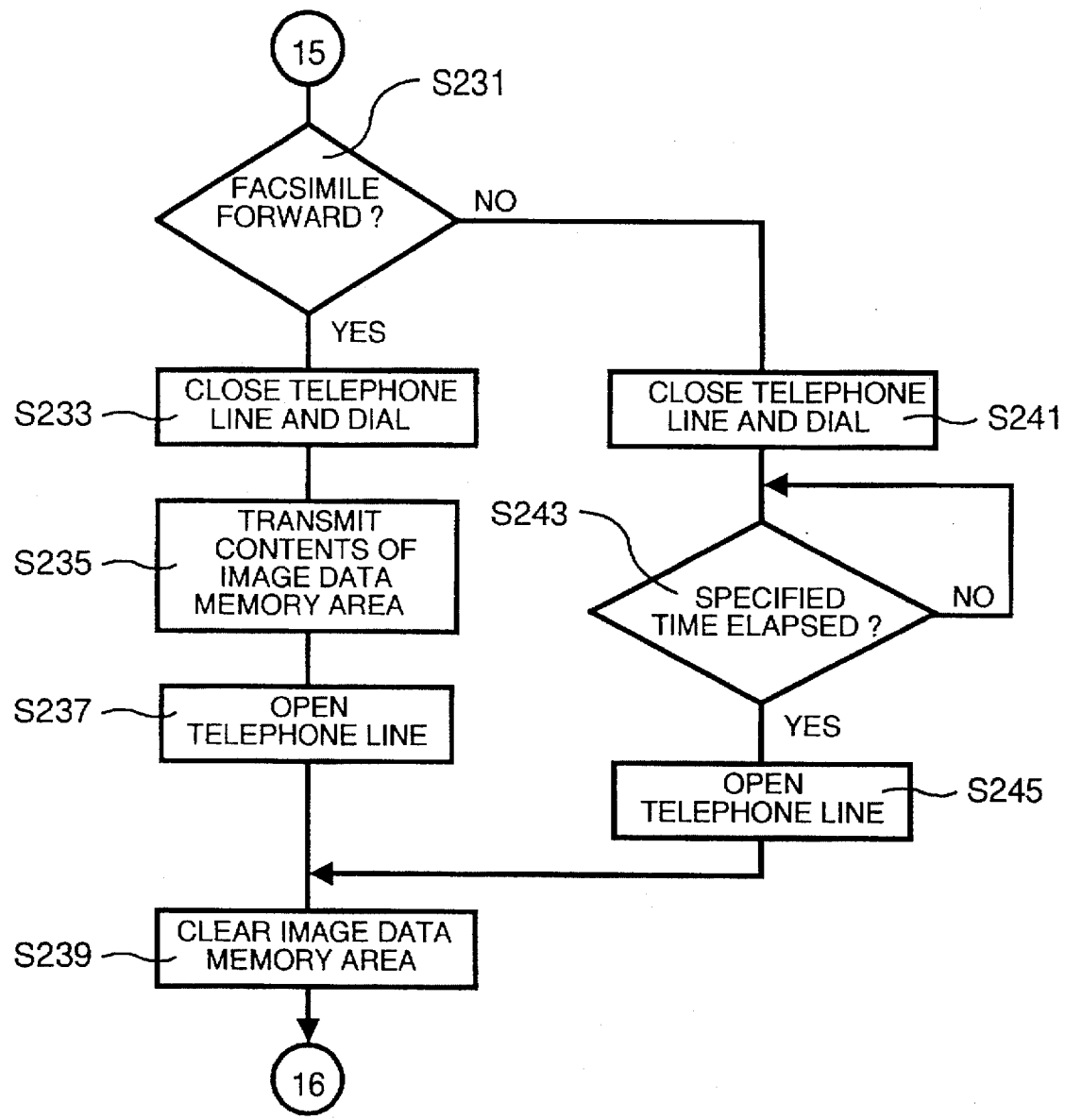
Figure 16:
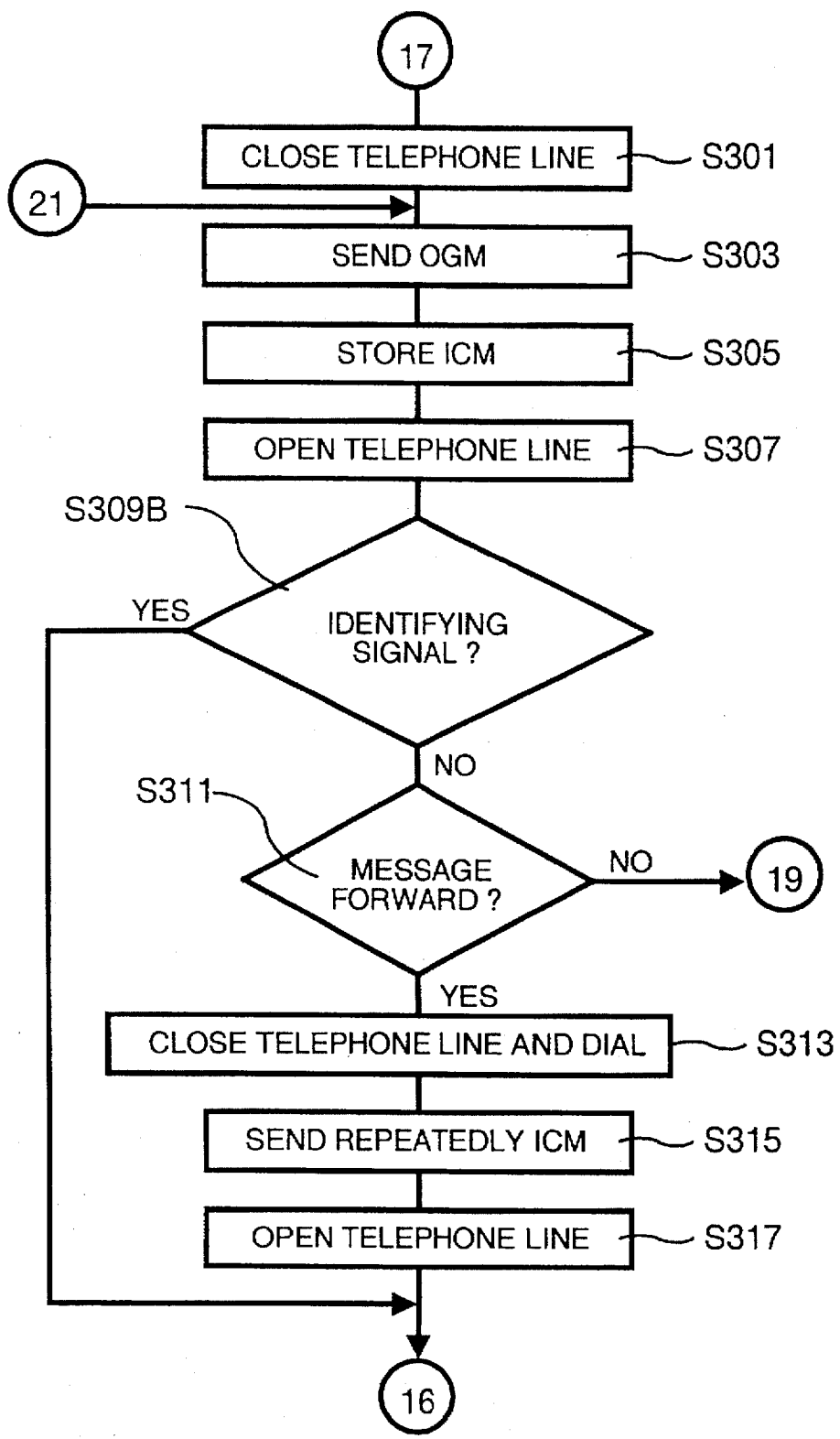
Figure 17:
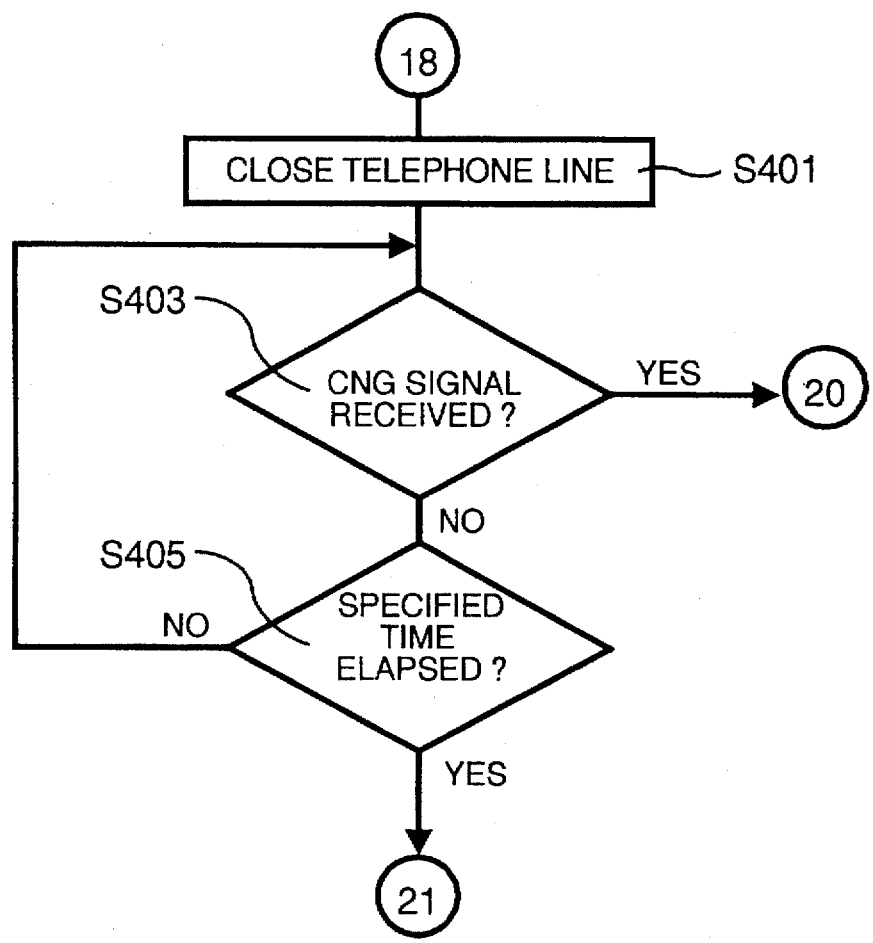

In order to accomplish these processes, despite the fact that the processes of FIGS. 9A,9B and 11 of the second embodiment differ in the third embodiment, as shown in FIGS. 14A,14B and 16, many sub-processes are the same as for the second embodiment. Among the built-in TAD mode processes, a process different from the second embodiment is described with reference to FIGS. 13, 14A, 14B, 15 and 17.

As the process is commenced, shown in FIGS. 14A,14B, first a determination is made whether the calling signals are detected at step S201. If detected (YES at S201), the process goes to step S209.

At step S209, the stored contents of the condition memory area 7c in EEPROM 7 are searched and a determination is made whether a sharing state of facsimile and telephone is set. If the stored contents of the condition memory area 7c in the EEPROM 7 is the facsimile-only state, the processes from steps S211 to S245, shown in FIGS. 14A,14B and 15, are accomplished.

First, the telephone line is closed in step S211, and a specified amount of the image data being sent from another facsimile device (not shown) is stored in the buffer 5 and in the image data memory area 9a of the image memory 9 (S221). Next, a determination is made whether the recognition data is included in the image data stored in the image data memory area 9a (S222). The determination is accomplished by reading the recognition data from the recognition data area 9c and checking whether a pattern matching the pattern of the recognition data exists in the image data in the image data memory area 9a. Circular figures or word columns indicating the origin of the transmission, for example, can be used as the recognition data. Moreover, when attaching the recognition data to the image data being transmitted, if the attaching position is fixed at a specified position, the determination is made whether the recognition data is included in the received image data just by checking the pattern in a specified area within the received image data with the pattern of the recognition data. Therefore, because the area is limited where the pattern should be checked that has the recognition data, the recognition process is effectively and efficiently accomplished.

In this recognition process, if the recognition data is determined to be included in the image data (YES at S222), that means that the image data that was transferred from the facsimile device has again been sent via another facsimile. Thus, there is no requirement to write the image data in the bit image memory area 9b by opening it as a bit image and for sequentially providing the contents to the printer 15, as shown in step S225, or for accomplishing the transfer process shown in FIG. 15. Therefore, the telephone line is opened (S219) and the process returns to step S201.

On the other hand, if the recognition data is determined not to be included in the image data (NO at S222), the transferring communication or the paging function is executed by the process from step S223 to step S245, which is similar to that of the second embodiment.

Furthermore, at step S209 of the flow chart of FIGS. 14A,14B, if the stored contents in the state memory area 7c of the EEPROM 7 is the telephone-only state, the process from step S301 to step S317 of FIG. 16 is accomplished.

In other words, the telephone line is closed (S301), and the OGM stored in the voice memory 10 is sent (played) to the caller (S303). Then the ICM being sent from the caller is stored in the voice memory 10 (S305), and the telephone line is opened (S307). Subsequently, the ICM is read from the voice memory 10 to be analyzed by filtering, and the recognition process is accomplished which determines whether the ICM includes the recognition signal at a specified frequency which is stored in the recognition signal area 10a (S309B). In the recognition process, if the recognition signal is determined to be included in the ICM (YES at S309B), that means that the voice data transmitted from the sending device was also sent via another machine. Thus, the execution of transferring communication shown in steps S311–S317, or of the paging function, shown in steps S241–S243 of FIG. 15, is not required and the process returns to step S201.

On the other hand, if the recognition signal is determined not to be included with the ICM (NO at S309B), the transferring communication shown in steps S311–S317 or the paging function shown in steps S241–S243 in FIG. 15 is executed, which is similar to the second embodiment.

Back at step S209, in the flow chart of FIGS. 14A,14B, the processes of steps S401–S405 are executed if the stored contents of the state memory area 7c of the EEPROM 7 is in the facsimile-telephone sharing state.

In other words, the telephone line is closed (S401), and the determination is made whether the CNG signal which indicates that the transmitter has commenced sending the facsimile data has been received (S403). If the CNG signal has been received (YES at S403), the processes from step S221 in FIGS. 14A,14B are accomplished. The process from step S221 is the same as the process accomplished when the stored contents of the state memory area 7c were determined to be in the facsimile-only state at step S209. On the other hand, if the CNG signal was not received (NO at S403), the determination is made whether a specified time has elapsed (S405). If the specified time has not elapsed (NO at S405), the process returns to step S403.

If the specified time has elapsed (YES at S405), the transmitter is considered as a telephone, or voice, caller, and the process from step S301 in FIG. 16 is accomplished. The process from step S301 is the same as the process accomplished when the stored contents of the state memory area 7c were determined to be in the telephone-only state at step S209.

Moreover, substituting the detection of the recognition data at step S222 in FIGS. 14A,14B and the detection of the recognition signal at step S309B in FIG. 16, by storing a specified length of time for the outgoing (sent) data, comparing the incoming (received) data with stored outgoing data at the time of receiving the data, and determining whether the data is the same, the execution of the transferring communication or the paging function may be terminated if it is determined that the data was the same.

In the second embodiment described earlier, when it is determined that an interval between two communications for receiving data when the caller (transmitter) is the same is less than the specified time, unnecessary communications are avoided by terminating the transferring communication of the data received at the second time. On the other hand, in the third embodiment, when the data once transmitted from the originating device is again sent, the received data is immediately determined to be no longer data required to be sent by detecting that the recognition data or the recognition signal is attached to the received data. Therefore, compared to terminating the transmission when receiving the second transmission from the same machine, the unnecessary communication can be terminated earlier.

Next, the fourth embodiment is described. Common structures and actions with the first embodiment are omitted, and common drawings referred to are the drawings for the first embodiment.

Figure 18:
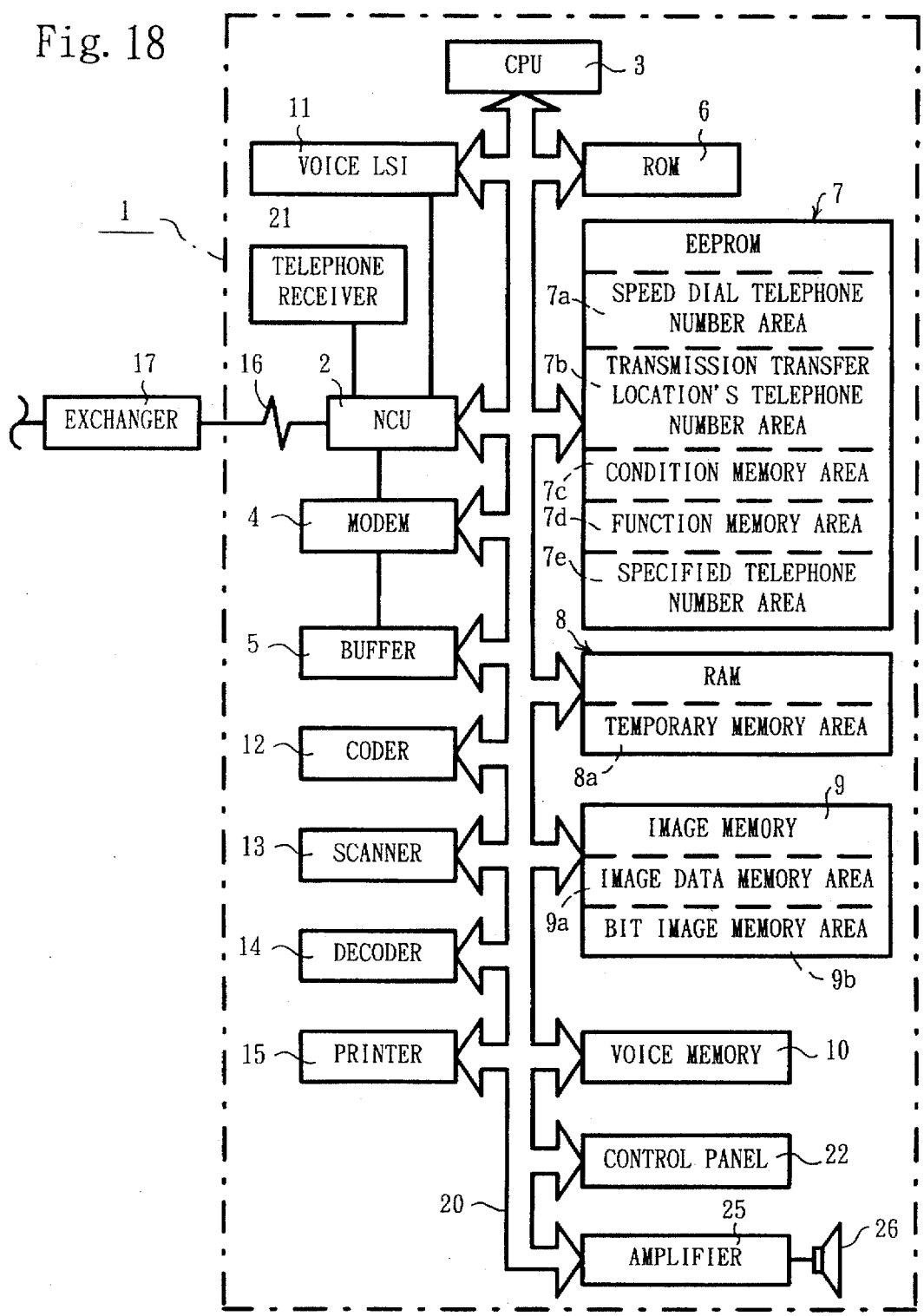
FIG. 18 is a block diagram of the facsimile device in the fourth embodiment.

The facsimile device for the fourth embodiment is structured similarly to that of the first embodiment, as shown in FIGS. 1 and 18. However, the control program stored in ROM 6 differs from the control program in the first embodiment to execute the function characterizing the fourth embodiment. Moreover, a specified telephone number area 7e is established in the EEPROM 7 in addition to each of the areas described in the first embodiment. This is an area for storing specified telephone numbers for the functions in the built-in TAD mode, which is set up in the setup process and which will be described later.

The normal facsimile receiving actions, memory receiving actions, and normal facsimile sending actions are substantially similar to the actions described in the first embodiment.

The normal telephone receiving actions and the normal telephone sending (calling) actions are the same as the actions in the first embodiment.

Furthermore, actions when the facsimile/telephone switching mode is selectively set up using the mode setup keys 22d on the control panel 22 are the same as the actions in the first embodiment.

Next, a case where the built-in TAD mode is selectively set up using the mode setup key 22d on the control panel 22 is described.

Figure 19:
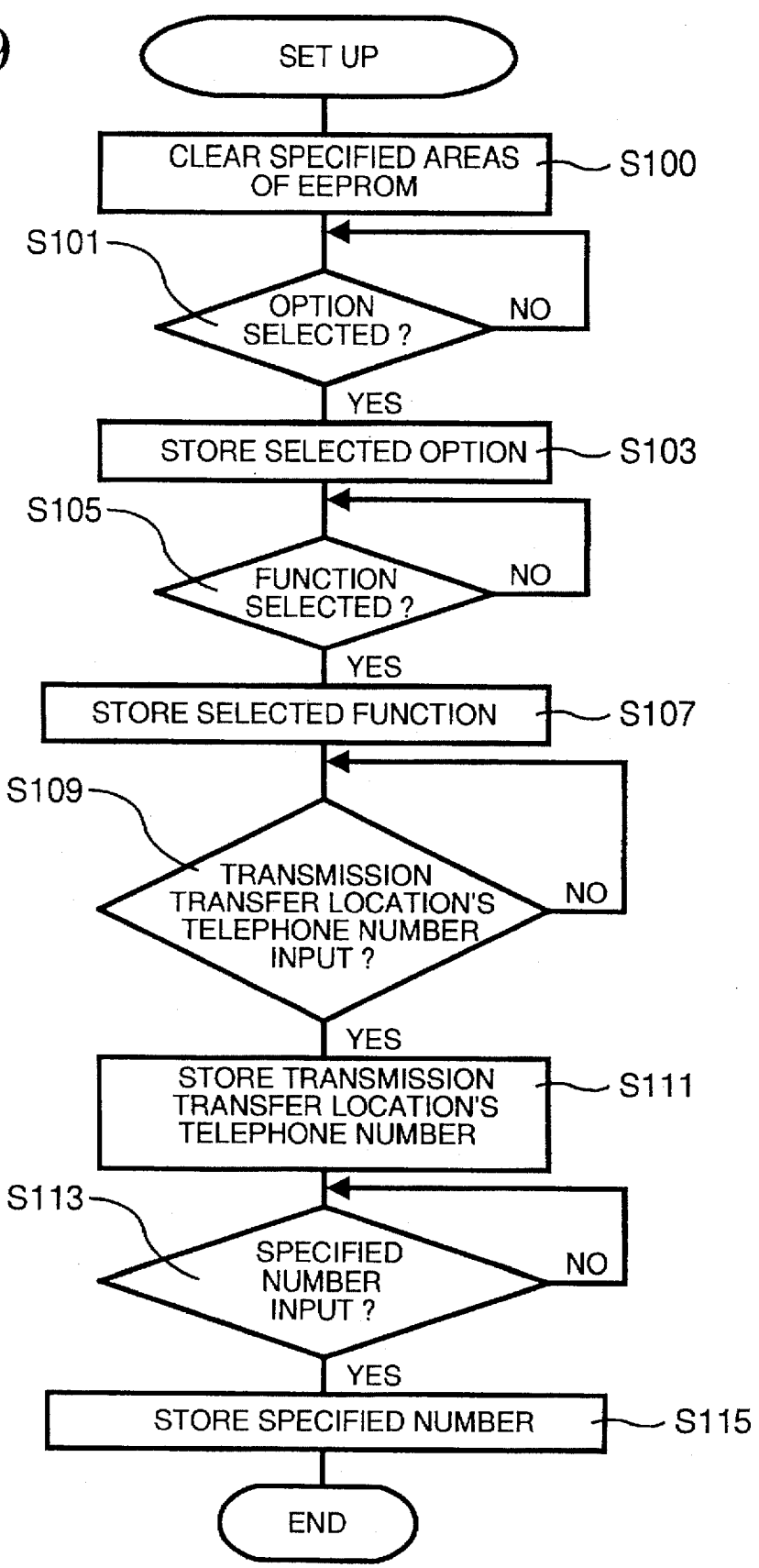

First, for the setup process for the built-in TAD mode in the facsimile device 1, as shown in the flow chart of FIG. 19, the actions from steps S100 to S111 are the same as actions in the first embodiment. When storing the transmission transfer location's telephone number is completed at step S111, the determination is made whether a specified telephone number for the paging function has been input from the number pad 22b on the control panel 22 (S113). At this time, the originator for the paging function is the transmission transfer location's telephone number which forwards the original communicated contents to the specified telephone number by means of the paging function. If the specified telephone number has not yet been input, NO at step S113, the process waits until the number has been input, and if it has been input (YES at S113), the number is stored in the specified telephone number area 7e in the EEPROM 7 and the process is completed. In addition, a multiple number of specified telephone numbers for the paging function can be input.

Next, the built-in TAD mode process is described based on the flow charts of FIGS. 20A to 23.

Figure 20A:
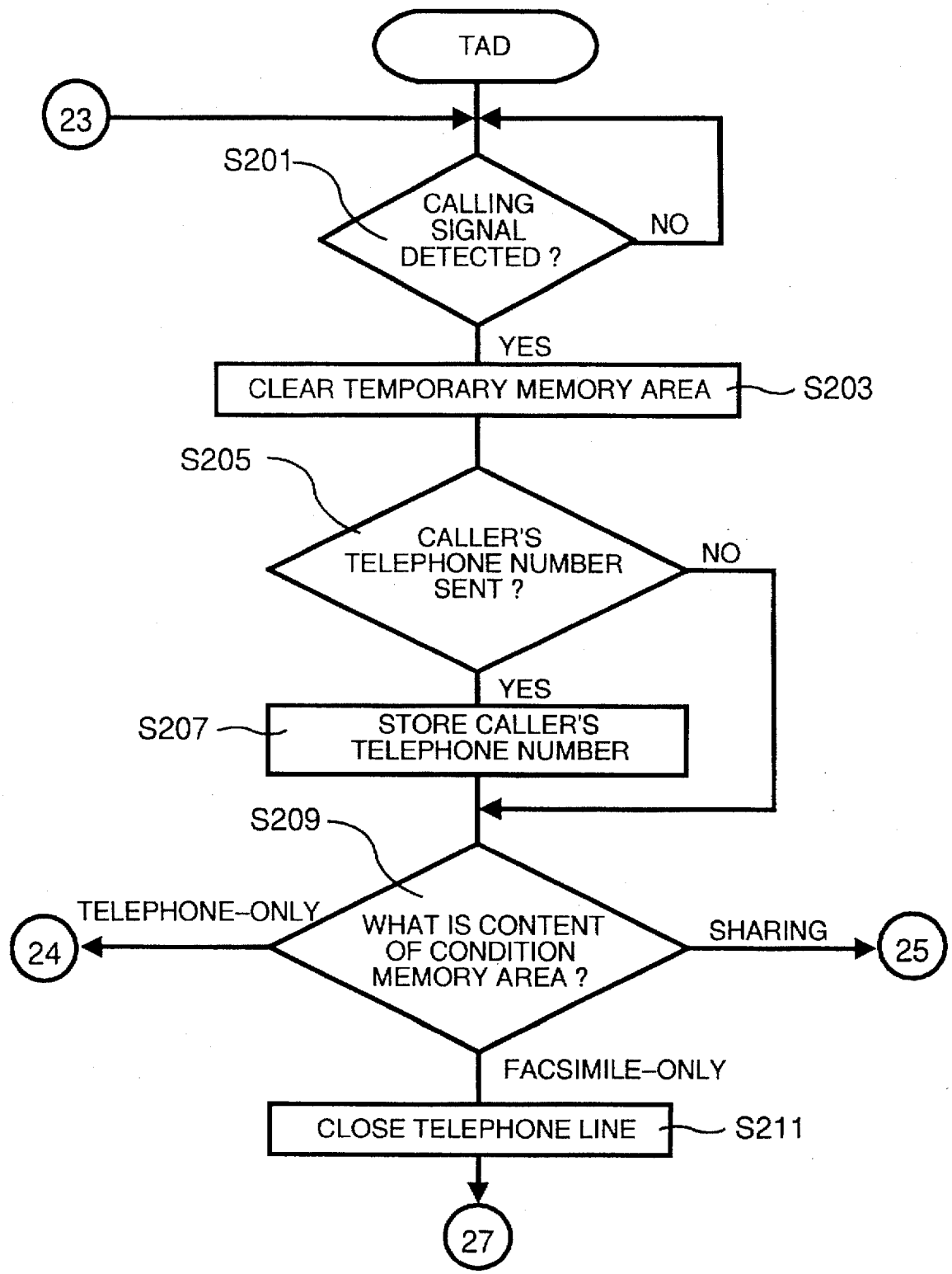
Figure 20B:
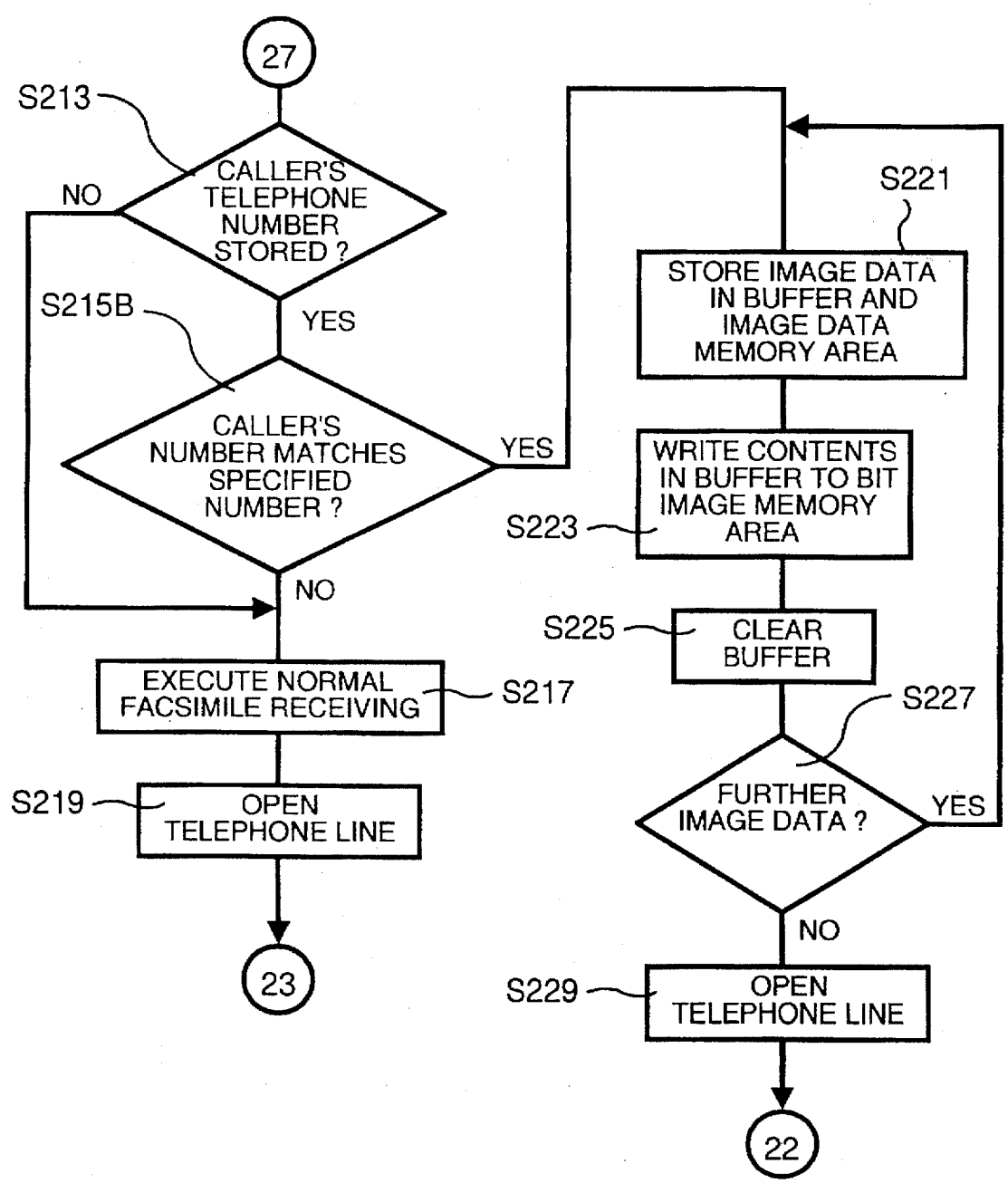
Figure 21:
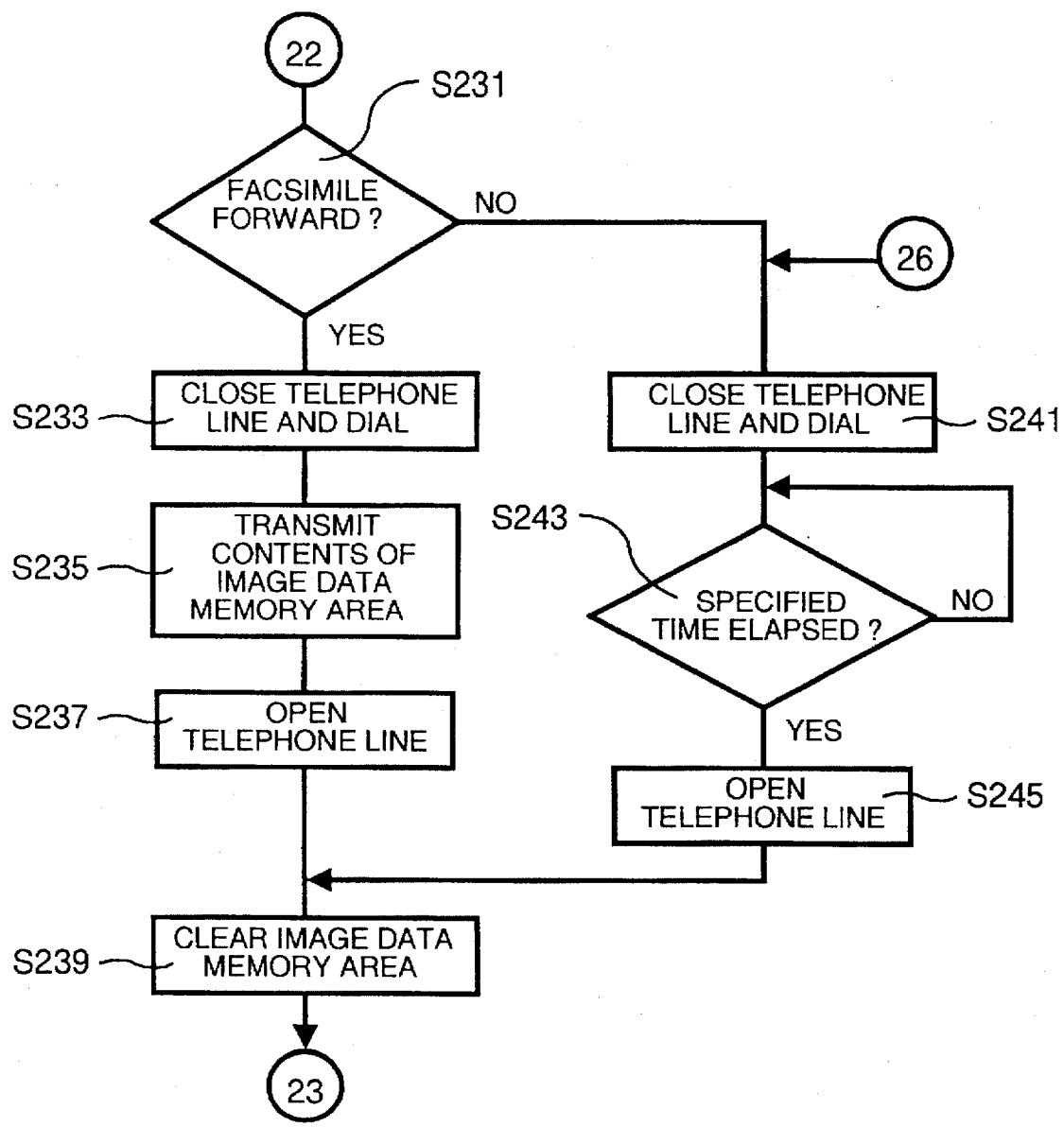

As shown in FIGS. 20A,20B the process from steps S201 to S211 is the same as the process of the first embodiment shown in FIGS. 4A, 4B. If the stored contents of the condition memory area 7c is determined to be the facsimile-only state, the processes from steps S211 to S245, shown in FIGS. 20A,20B and 21, are accomplished.

After closing the telephone line at S211, the determination is made whether the caller's telephone number is stored in the temporary memory area 8a of the RAM 8, as shown in FIGS. 20A,20B. If the caller's telephone number has not been stored in the temporary memory area 8a of the RAM 8 (NO at S213), the normal facsimile receiving actions described earlier are accomplished (S217), and then the telephone line is opened (S219) and the process returns to step S201.

At step S213, if the caller's telephone number has been stored in the temporary memory area 8a of the RAM 8, a determination is made whether the caller's telephone number matches one stored in the specified telephone number area 7e in the EEPROM 7 (S215). If there is no match, the processes at steps S217 and S219, described before, are accomplished and the process returns to step S201.

If the caller's telephone number stored in the temporary memory area 8a of the RAM 8 matches a number stored in the specified telephone number area 7e in the EEPROM 7 (YES at S215), a specified amount of image data being sent from another facsimile device (not shown) is stored in the buffer 5 and the image data memory area 9a of the image memory 9 (S221). Then, the processes from steps S223 to S245 are accomplished in a manner similar to the first embodiment shown in FIGS. 4A,4B and 5.

Figure 22:
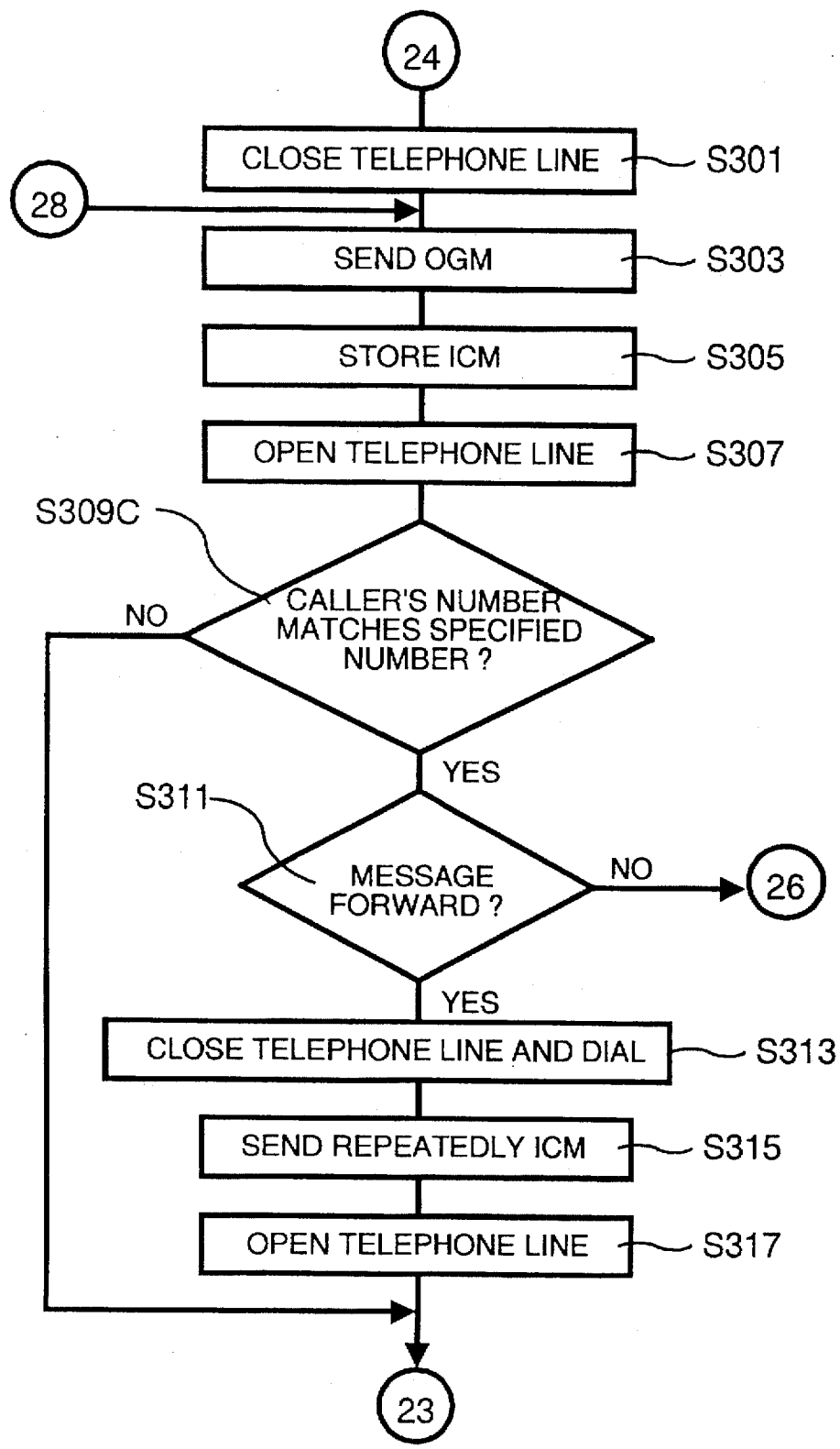

On the other hand, if the contents stored in the condition memory area 7c are determined to be in the telephone-only state at step S209, the processes from steps S301 to S317, shown in FIG. 22, are accomplished. The process at each step, other than step S309C, is the same as the first embodiment shown in FIG. 6.

At step S309C, a determination is made whether the caller's telephone number stored in the temporary memory area 8a of the RAM 8 matches the telephone number stored in the specified telephone number area 7e of the EEPROM 7. If not matched (NO at S309C), the process returns to step S201. In addition, the process at step S309C determines NO when the caller's telephone number is not stored at the temporary memory area 8a of the RAM 8.

On the other hand, at step S309C, if the caller's telephone number stored in the temporary memory area 8a in the RAM 8 matches the telephone number stored in the specified telephone number area 7e in the EEPROM 7 (YES at S309C), the determination is made whether the contents stored in the function memory area 7d in the EEPROM 7 is the message forward function (S311).

At step S311, if the contents stored in the function memory area 7d in the EEPROM 7 is the message forward function (YES at S311), the process returns to step S201 in FIG. 20 after accomplishing the processes after step S313.

On the other hand, if the contents stored in the function memory area 7d in the EEPROM 7 is not the message forward function (NO at S311), since it is the paging function, the processes following step S241 in the FIG. 21 are executed.

Thus, in the fourth embodiment, for the facsimile device 1, at the setup process of the built-in TAD mode, only when either the facsimile-only state or the facsimile-telephone sharing state is selected and when the telephone number for transfer and the telephone number of an effective transmitter are set up, paging (only automatic calling) or forwarding facsimile (automatically calling and transferring the contents of the facsimile) is accomplished.

Therefore, a person at the specified transferring location (i.e. a person who specified the transferring location because of his/her absence from the original receiving location, or a person who works at another branch office to which the facsimile is transferred via an office that is the original receiving location) does not receive an announcement (automatic calling or the transfer of the communicated contents) when unnecessary information has been sent to the facsimile device 1 that is the original receiving location, resulting in the obtaining the efficacy of being released from operations to check to see if the received data is or is not necessary every time the data is received.

For example, in the above described embodiment, at the setup process in FIG. 19, the specified telephone number for the paging function was stored in the specified telephone number area 7e in the EEPROM 7. However, as a substitution for this, a specified telephone number not for the paging function, that is, a transmitter which provides only unnecessary information (ineffective transmitter), can be stored. In that case, at step S215 in FIGS. 20A,20B, if the caller's telephone number stored in the temporary memory area 8a in the RAM 8 matches the one stored in the specified telephone number area 7e in the EEPROM 7, the process advances to step S217, and if it does not, the process is executed so that it goes to step S221. Moreover, at step S309C in FIG. 22, if the caller's telephone number stored in the temporary memory area 8a in the RAM 8 matches the one stored in the specified telephone number area 7e of the EEPROM 7, the process returns to step S201, and if it does not, the process advances to step S311.

Therefore, after the announcement (automatic calling or transferring of the communicated contents) for the received data, except when the ineffective transmitter calls, efficacy is obtained in which a person at a specified location for transmitting (transferring) data would not be annoyed by an unnecessary announcement.

Furthermore, at the setup process shown in FIG. 19, for example, after the process at step S111, the process determines whether the specification of the intended person for the paging function should be accomplished. If the intended person is not specified, the setup process may be normally completed. If the intended person is specified, the process after step S113 may be accomplished. In the case where the intended person for the paging function is not specified in the setup process, the process after step S221 may be immediately accomplished after the process at step S211 when the contents stored in the condition memory area 7c in the EEPROM at step S209 of FIGS. 20A,20B, and the process after step S311 may be immediately accomplished after the process at step S307 of FIG. 22 in the telephone-only state at step S209.

Thus, if the specification of the intended person for paging function was not accomplished in the setup process, for all the cases when the communication is made during the built-in TAD process mode being set, automatic calling (the communicated contents are additionally transferred when the facsimile forward function or the message forward function has been selected) can be accomplished to the telephone number for the transmitting location stored in the transmission transfer location's telephone number area 7b in the EEPROM 7.

In addition, the process for the facsimile device 1 described in the first, second, third, and fourth embodiments can be changed (modified) as follows.

When the facsimile forward function is set in the setup process of the built-in TAD mode, the image data being received may only be stored in the image data memory area 9a of the image memory 9 and not printed out on recording paper during the processes from steps S221 to S227.

Moreover, in the built-in TAD mode process, when the paging function is set (NO at S231), the following processes may be accomplished before clearing the image data memory area 9a at step S239 and after opening the telephone line at step S245. Namely, a determination is made whether there was a request for a remote control communication (i.e. retrieval communication) from the telephone number at the transmitting location which had been called automatically. If there was not a request for the remote control communication, the process waits until the request is made. If there was a request for the remote control communication, the telephone number is closed, and the contents (entire contents of the communicated contents) stored in the image data memory area 9a in the image memory 9 are transferred. Then the telephone line is opened after the completion of the transfer, and the process at step S239 is accomplished thereafter.

As is clear from the explanation described above, in the facsimile device 1 in the first, second, third, and the fourth embodiments, if the facsimile forward function or the message forward function is set during the setup process of the built-in TAD mode, the contents of the facsimile or the contents of the telephone call from the effective transmitter can normally be known at the specified transferring location, and thus quick reaction can be accomplished based on the contents.

Furthermore, in the setup process of the built-in TAD mode, when the facsimile forward function is selected, since only information from the effective transmitter is transferred, the recording paper will not wasted at the transferring location, and the problem is solved in which the facsimile device cannot immediately react when the truly effective information is sent due to the closed telephone line for sending unnecessary information.

What is claimed is:

1. A communication device wherein a specified identifier for a transmission transfer location is stored in a first memory, the transmission transfer location stored in the first memory being automatically called based on a data communication from another communication device, the communication device comprising:

the first memory storing a preset specified telephone number;

a determiner determining whether the data communication matches a predetermined condition to call automatically the transmission transfer location stored in the first memory based on contents of the data communication or the transmitter of the data communication; and an automatic calling element automatically calling a telephone number associated with the specified identifier of the transmission transfer location stored in the first memory when the determiner determines the data communication matches the predetermined condition, wherein the predetermined condition is a test to judge whether the data communication has been previously received from the another communication device and the automatic call is not made when the judgment is the data communication came from the another communication device.

2. The communication device as claimed in claim 1, further comprising:

a second memory storing the caller's information sent through a telephone line, wherein the determiner includes a comparator comparing the caller's information stored in the second memory and transmission transfer location's information stored in the first memory, and determines based on a result of the comparison from the comparator whether automatic calling is to be accomplished for the specified transmission transfer location stored in the first memory.

3. The communication device as claimed in claim 2, wherein the determiner determines that automatic calling is not to be accomplished for the specified transmission transfer location stored in the first memory if a determination is made that both parties as compared by the comparator match.

4. The communication device as claimed in claim 3, further comprising a third memory storing data from another communicating device, wherein the determiner determines that automatic calling is not to be accomplished for transferring the data stored in the third memory to the specified transmission transfer location stored in the first memory if the determination is made that both parties compared by the comparator do match.

5. The communication device as claimed in claim 1, wherein the determiner includes a detector detecting that data with the same caller's information was received within a specified length of time and determines whether automatic calling is to be made to the transmission transfer location's telephone number stored in the first memory based on the detection result from the detector.

6. The communication device as claimed in claim 5, further comprising:

a second memory storing a time at every data when the communication was made with a caller's telephone number sent through a telephone line, wherein the determiner includes:

a comparator comparing the caller's telephone number sent through the telephone line at the time to telephone numbers stored in the second memory; and a detector detecting the period of time between each communication from another communication device, wherein the determiner determines the automatic calling is not to be made to the transmission transfer location's telephone number stored in the first memory if the caller's telephone number matches, after comparison by the comparator, a telephone number in the second memory, and if it is detected by the detector that the time between each communication is less than the specified length of time based upon the time when an original communication was made associated with the caller's telephone number and the time when a subsequent communication was made associated with the caller's telephone number through the telephone line.

7. The communication device as claimed in claim 1, further comprising:

a second memory storing data from the transmitter;

a recognition data adder adding specified recognition data to the data when transferring the data stored in the second memory to the transmission transfer location's telephone number stored in the first memory, wherein the determiner includes a detector detecting whether the specified recognition data has been added to the data when the data is received from the transmitter and determines that the automatic calling is to be made to the transmission transfer location's telephone number stored in the first memory when the detector detects the specified recognition data has been added.

8. The communication device as claimed in claim 1, further comprising:

a second memory storing an effective transmitter's telephone number for data communication, wherein the determiner includes:

a comparator comparing a caller's telephone number and the effective transmitter's telephone number stored in the second memory, the determiner determines that automatic calling of the specified telephone number of the transmitting transfer location stored in the first memory is to be accomplished.

9. A data forwarding method for forwarding data from a sending device to a receiving device through an intermediate device, comprising the steps of:

setting an operating condition for the intermediate device;

setting a retransmission function to a forwarding destination appropriate to the operating condition;

storing a telephone number for each recipient of the retransmission function in a first memory;

detecting an incoming communication;

storing the incoming communication in a second memory;

determining if identification data accompanies the incoming communication; and executing the retransmission function to the forwarding destination when the identification data matches a condition for executing the retransmission function, wherein the condition for executing the retransmission function excludes retransmitting the incoming transmission to a source of the incoming transmission.

10. The method as claimed in claim 9, wherein the operating condition is one of facsimile-only, telephone-only and facsimile/telephone operation.

11. The method as claimed in claim 10, wherein the retransmission function is one of the paging function and the message forwarding function when in the telephone-only operating condition, one of the paging function and the facsimile forwarding function when in the facsimile-only operating condition, and one of the paging function and both of the message and facsimile forwarding functions when in the telephone/facsimile operating condition.

12. The method as claimed in claim 9, further comprising the steps of:

storing a telephone number identifying a first incoming communication in a third memory; and checking a telephone number of a subsequent incoming communication against the telephone number in the third memory to see if they match, wherein the retransmission function is executed if no match occurs.

13. The method as claimed in claim 12, further comprising the steps of:

storing a telephone number identifying a first incoming communication in a third memory;

checking a telephone number of a subsequent incoming communication against the telephone number in the third memory to see if they match; and detecting if a predetermined length of time has passed between receipt of a first incoming communication and receipt of the subsequent incoming communication, wherein the retransmission function is executed if one of no match occurs and the predetermined length of time has passed.

14. The method as claimed in claim 9, further comprising the steps of:

storing recognition data in a sub-memory of the second memory;

checking the incoming communication for the recognition data;

determining whether the incoming message includes the recognition data; and terminating communications when the incoming message includes the recognition data.

15. The method as claimed in claim 9, further comprising the steps of:

storing a specified telephone number in the first memory;

checking whether the identification data of the incoming message matches the specified telephone number; and executing the retransmission function when a match occurs.

* * * * *